July 8, 1958
D. E. KENYON
2,842,759
REMOTE RADAR INDICATING SYSTEM
Filed Sept. 17, 1948
9 Sheets-Sheet 2
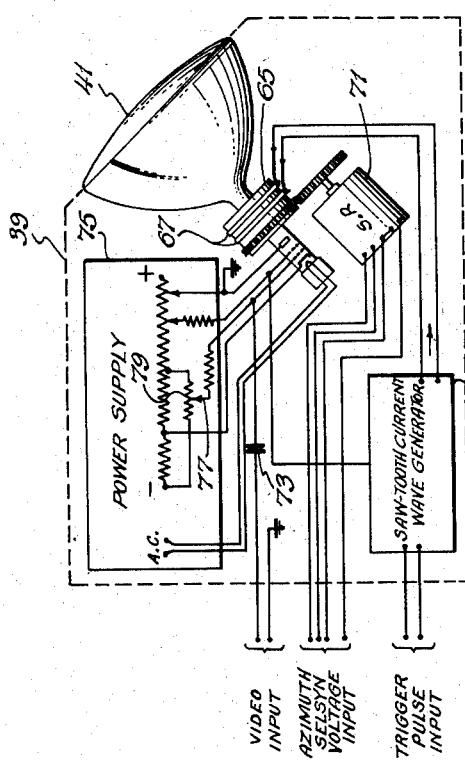
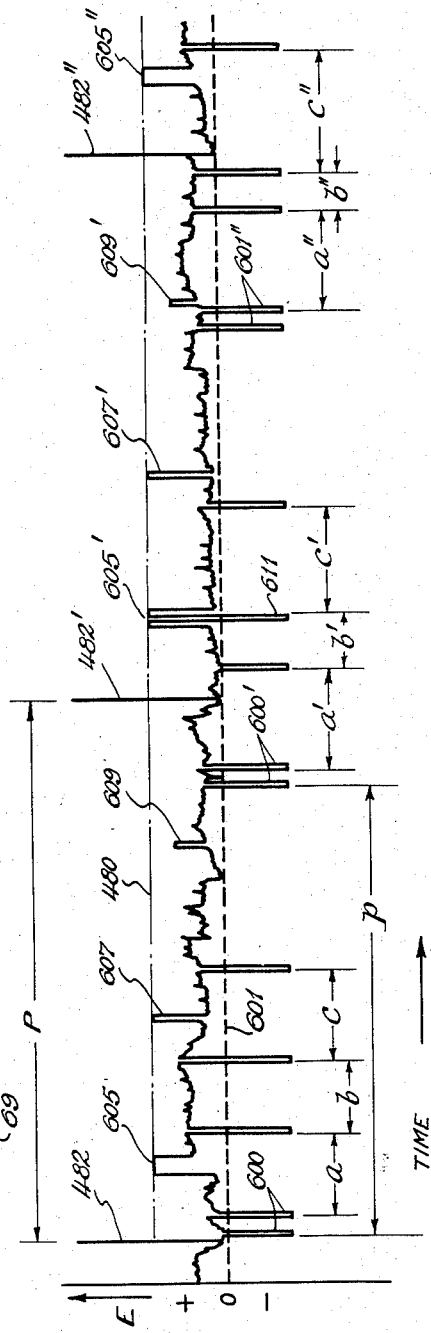
INVENTOR
DAVID E. KENYON
BY
Thomas M. Ferrill, Jr.
ATTORNEY

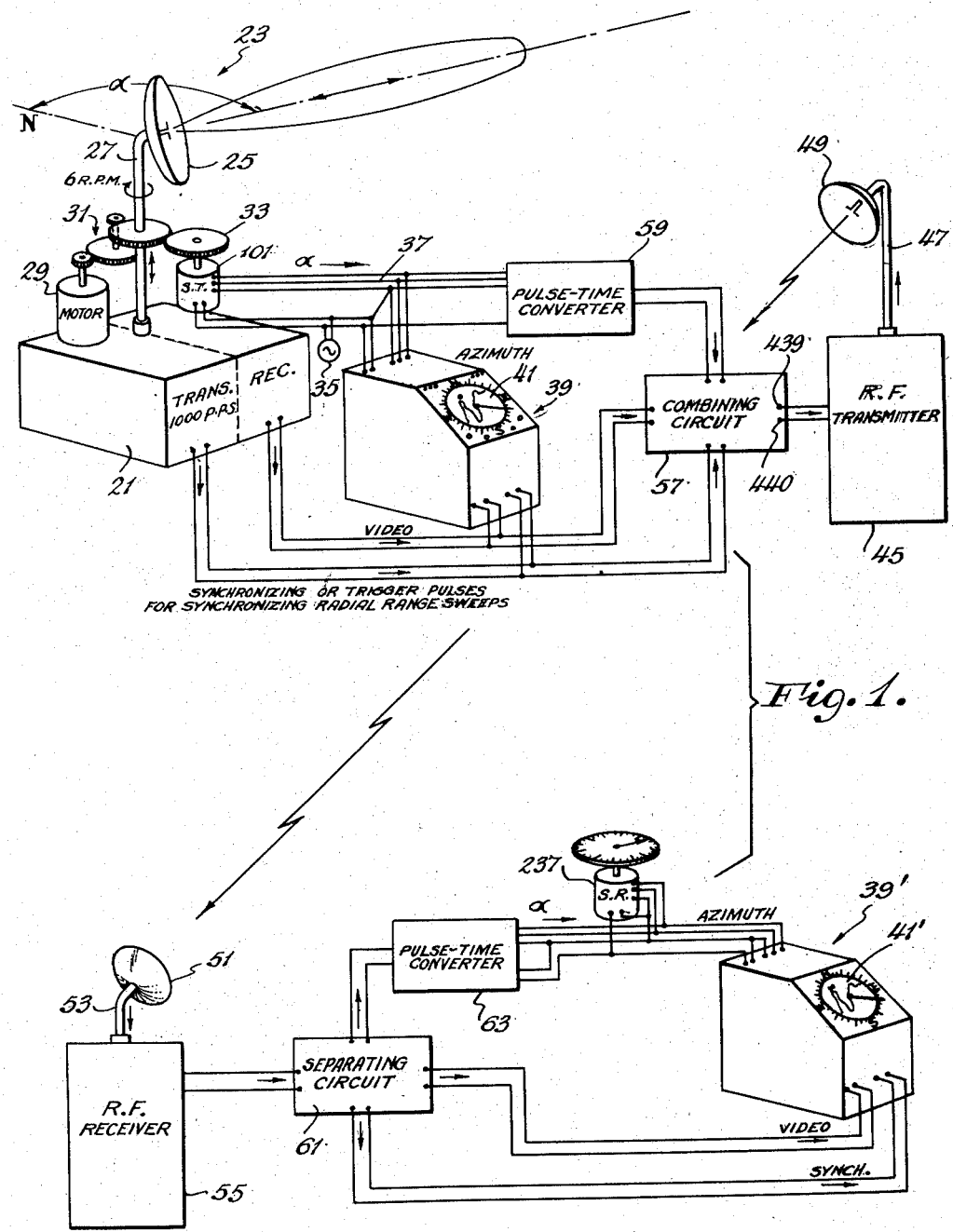

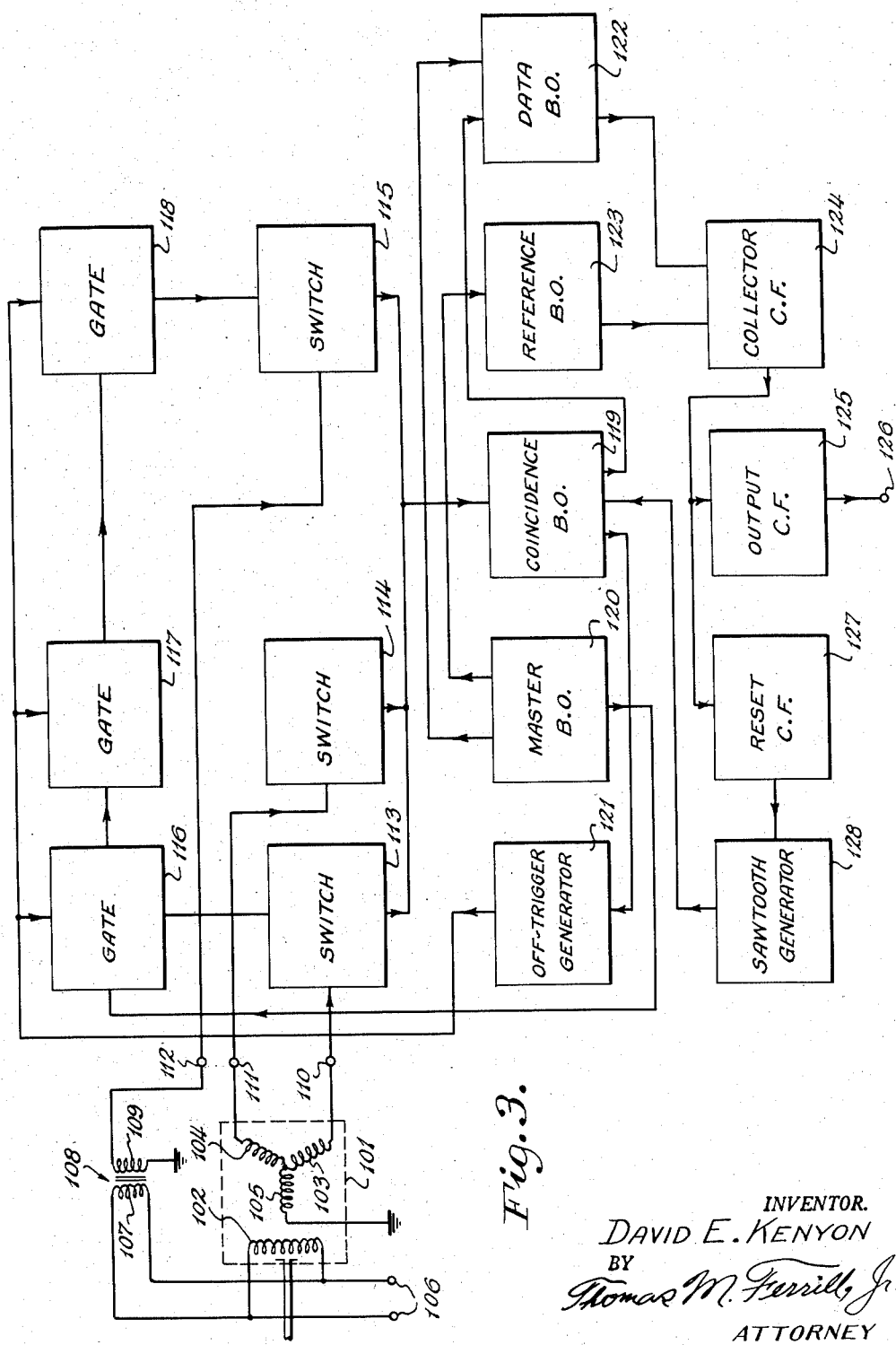

July 8, 1958  D. E. KENYON  2,842,759
REMOTE RADAR INDICATING SYSTEM
Filed Sept. 17, 1948  9 Sheets-Sheet 4

INVENTOR.
DAVID E. KENYON
BY
Thomas M. Ferrill, Jr.
ATTORNEY

July 8, 1958 D. E. KENYON 2,842,759
REMOTE RADAR INDICATING SYSTEM
Filed Sept. 17, 1948 9 Sheets-Sheet 5

INVENTOR.
DAVID E. KENYON
BY Thomas M. Ferrill, Jr.
ATTORNEY

July 8, 1958          D. E. KENYON          2,842,759
REMOTE RADAR INDICATING SYSTEM
Filed Sept. 17, 1948          9 Sheets-Sheet 6

INVENTOR.
DAVID E. KENYON
BY
Thomas M. Ferrill, Jr.
ATTORNEY

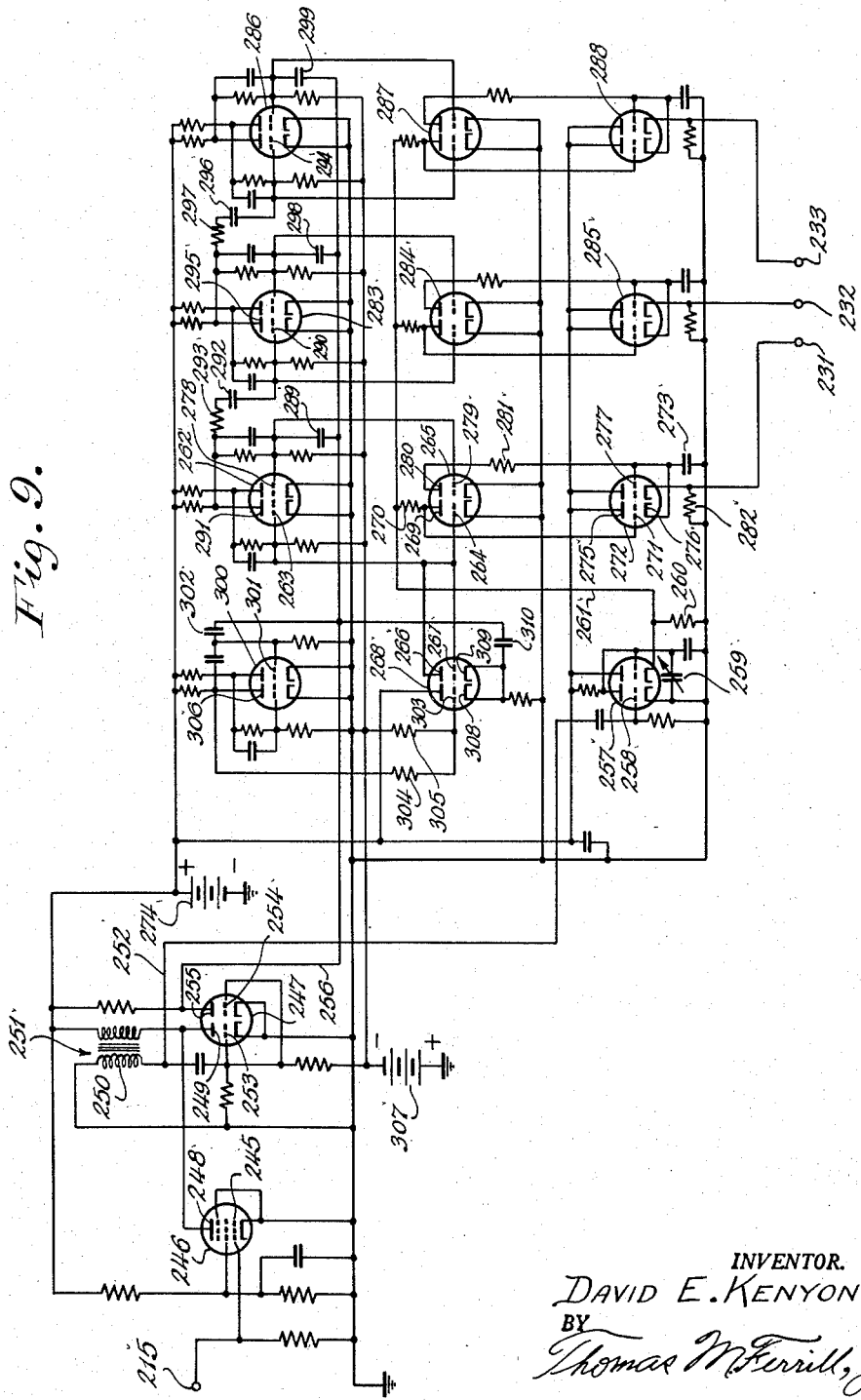

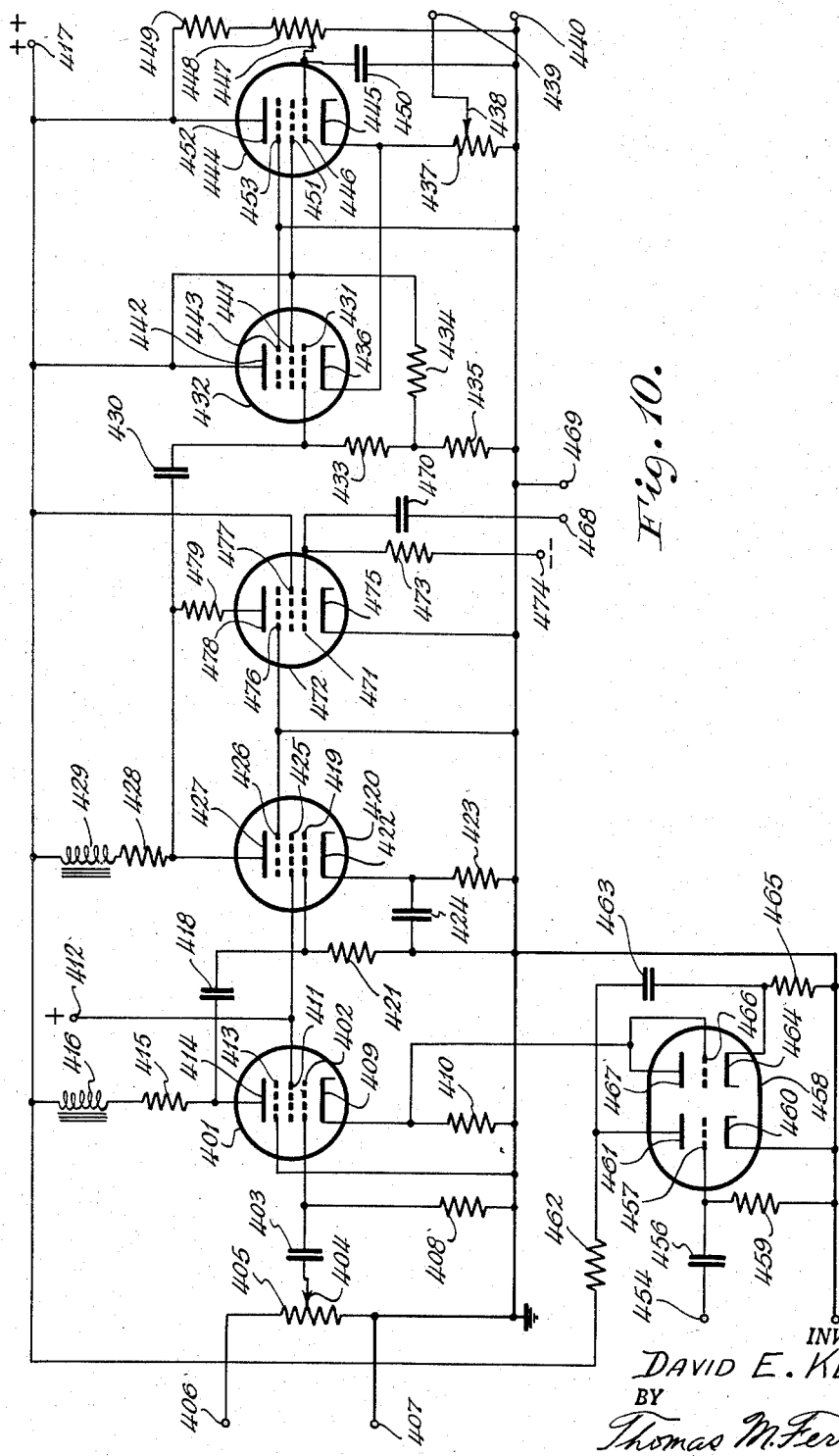

July 8, 1958
D. E. KENYON
2,842,759
REMOTE RADAR INDICATING SYSTEM
Filed Sept. 17, 1948
9 Sheets-Sheet 9
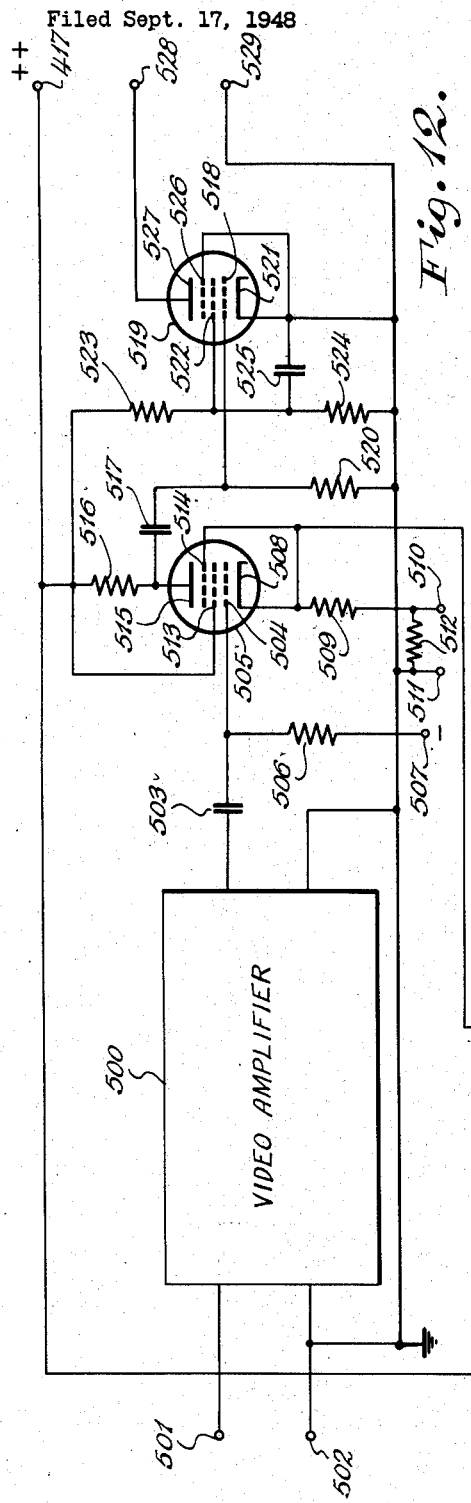
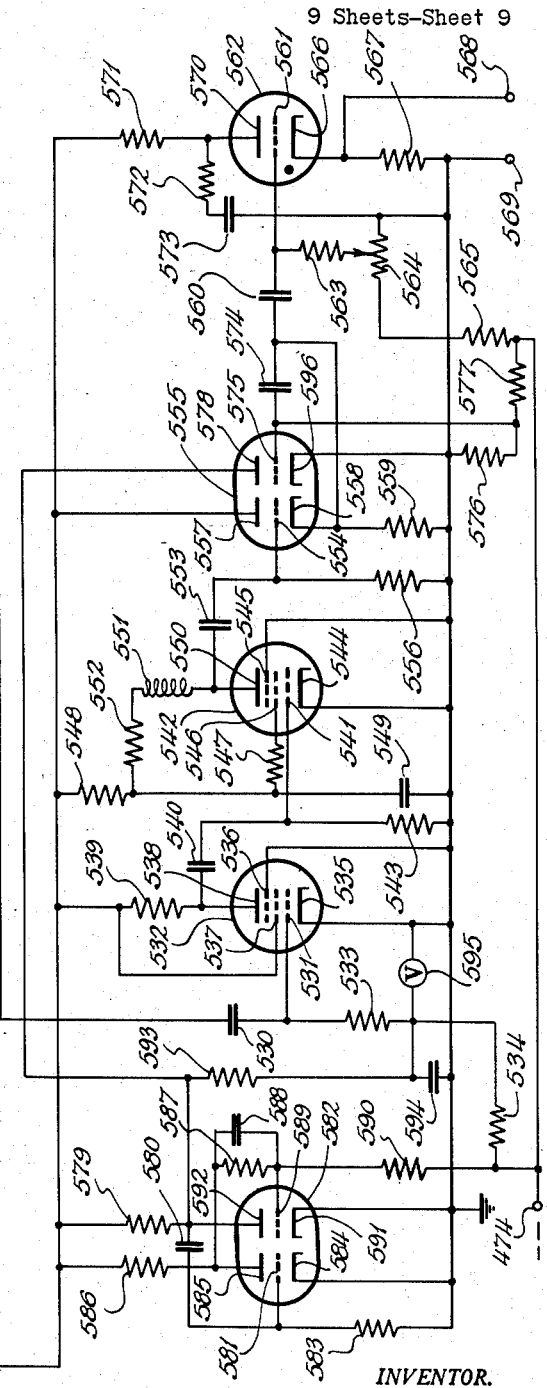
Fig. 12.
INVENTOR.
DAVID E. KENYON
BY
Thomas M. Ferrill, Jr.
ATTORNEY United States Patent Office 2,842,759
Patented July 8, 1958

2,842,759

REMOTE RADAR INDICATING SYSTEM

David E. Kenyon, Huntington, N. Y., assignor to Sperry Rand Corporation, a corporation of Delaware Application September 17, 1948, Serial No. 49,723

6 Claims. (Cl. 343—6)

This invention is a system for providing full and accurate indication of the positions of objects detected in the vicinity of a remotely located radar search system. It particularly concerns such indication distant from the point of scanning independently of any direct connections between the radar scanning system and the indicating arrangement.

This application is a continuation in part of my prior U. S. applications Serial No. 710,781, filed November 19, 1946, now Patent No. 2,736,007, and Serial No. 738,055, filed March 29, 1947, now Patent No. 2,570,249 issued October 9, 1951.

It has heretofore been proposed that data from numerous radar units located at selected points over a large region be supplied to a central station for collation, and for determination of overall positions and progress of movable objects. Such arrangements have been thought particularly desirable for tactical purposes where radar units are employed to search for and detect the approach of enemy war planes. Various systems have been devised for this purpose, including proposals for making permanent records for transmission, e. g. via facsimile, and other proposals involving employment of multiple pairs of transmission lines, with band width reduction and sacrifice of detail and picture quality, and with risk of loss of the data at the central station in event of failure or altered characterestics of any transmission line.

The disadvantages of proposals of this sort are readily apparent, in that numerous relatively vulnerable signal transfer links are required, and detail is sacrificed through the multiple transfers. Movement of targets, as indicated by progress of the radar images across the presentation screen, is obscured when various successive transfers or reproductions of the picture are made.

The requirement of multiple transmission lines for substantially immediate transfer of the radar data is itself a very serious limitation, tying up communication facilities, and moreover, limiting the use of the remote indicating radar system to employment between fixed stations.

It is an important object of the present invention to provide an improved remote radar data system, and in particular to provide such a system arranged to operate without any sacrifice of clarity and detail of the radar picture; and a further object is to provide immediate and exact duplication remote from the radar scanning system of the picture produced in the local indicator of the radar apparatus, or of the picture which would be produced if a local indicator of high quality were employed at the radar station. Along this line, it is an important object to provide a remote indicating radar system suitable for duplication in a craft, such as an airplane or a boat, of the radar view of various craft in the vicinity of a selected vantage point. In meeting this objective, it becomes possible to present in an airplane a representation of the aircraft in the vicinity of a selected vantage point on an airport, or to present in a vessel a picture of the ships and other craft and other energy reflecting objects such as buoys and wharves in the vicinity of a selected vantage point in a harbor.

Radar systems for airport traffic control purposes providing plan position indication to aircraft in the vicinity of the airport, have been provided for air traffic control purposes; and similarly, plan position radar apparatus has been provided for harbor traffic supervision, an example of the latter being a system installed in the harbor at Liverpool, England, by Sperry Gyroscope Co. Ltd. of England. It is highly desirable that a simple arrangement be provided for accurately duplicating on craft in the vicinity of such airports and seaports, the radar pictures as viewed from the selected fixed vantage points. It is desirable, moreover, that the apparatus required in the craft be relativly simple, and that a single radio channel with good economy of frequency spectrum be made to suffice for the complete data transmission between the radar transmitting and receiving and scanning apparatus and the remote indicating apparatus.

It is an object of the present invention to provide a remote radar transmission system suitable for these purposes, and taking into account these desiderata.

In the operation of a remote radar indicating system, azimuth angular synchronization and range sweep synchronization as well as video signal reproduction are required, and it is of great importance that the system be entirely free from mutual interference among these transmission elements.

It is an object of this invention, then, to provide an arrangement for economically and efficiently communicating these elements entirely free from any interference among the synchronization and video signals, and employing them in accurately reproducing the local radar picture.

In accordance with the present invention, the azimuth angular data is passed through a link including a selsyn transmitter arranged to receive sinusoidal primary excitation and to provide a plurality of secondary output voltages, the relative magnitudes and polarities of the secondary output voltages giving an unambiguous representation of instantaneous angular disposition of the radar scanning unit. The sinusoidal voltages present in the selsyn transmitter—the sinusoidal primary voltage and at least two sinusoidal secondary voltages—are supplied to an arrangement for producing recurrent series of pulses with intermediate pulse spacings corresponding to respective spacings of the three alternating voltages, each pulse series being representative of the instantaneous magnituds and polarities of the selsyn transmitter voltages and the recurrent frequency being many times higher than the frequency of the alternating voltage excitation supplied to the selsyn transmitter.

A combining circuit arrangement is provided for receiving the output voltages from the pulse time modulation converter and also for receiving the video output signals from the radar receiver and the trigger pulses from the radar transmitter and for supplying to a radio frequency transmitter a composite modulation wave representing all of these signals in a way susceptible of unambiguous component separation.

At the remote indicating station a radio frequency receiver is provided, and its detected output wave is supplied to separating circuit apparatus arranged to divide the composite demodulation wave into video signals and trigger pulses and a series of pulses resembling those provided in the transmitting station pulse time converter. A reconverter system receives the last-named recurrent series of pulses and reconstructs plural sinusoidal voltage waves corresponding to those produced by the selsyn transmitter at the radar scan arrangement, and these reconstructed voltage waves are employed for controlling the azimuth input circuits of the remote radar indicator.

For reasons which will subsequently appear more fully, the pulse time converter is made to operate at a pulse series recurrence frequency of the same order of magnitude as the radar pulse repetition rate, but neither synchronous therewith nor at a simple harmonic or subharmonic frequency.

An important feature realized through this arrangement is the interchangeability of local and remote indicator radar units so that no special constructional features are required in either one of these units, and the units are readily interchangeable for test or comparison purposes.

The above objects and advantages will be made more fully apparent, and further features will be brought out in the following detailed description of an embodiment of the present invention. In the drawings, Fig. 1 is a general system representation showing the radar scan arrangement located at a selected vantage point, and the remote indicating system coupled thereto over the radio link in accordance with the present invention, an optional radar indicator oscilloscope unit being illustrated as included at the location of the radar scan arrangement;

Fig. 2 illustrates the construction of one type of radar indicating unit suitable for use with the present invention;

Fig. 3 represents, partly in block form, a coder and associated apparatus for use at the transmitting end of a teledata system in accordance with the present invention;

Fig. 9 is a schematic circuit diagram of the decoder of Fig. 6;

Fig. 10 is a schematic circuit diagram of the signal-combining arrangements in accordance with the present invention;

Fig. 11 shows graphically the composite wave appearing at the output of the circuit of Fig. 10; and Fig. 12 is a schematic circuit diagram of the signal-separating arrangement.

Figure 4:
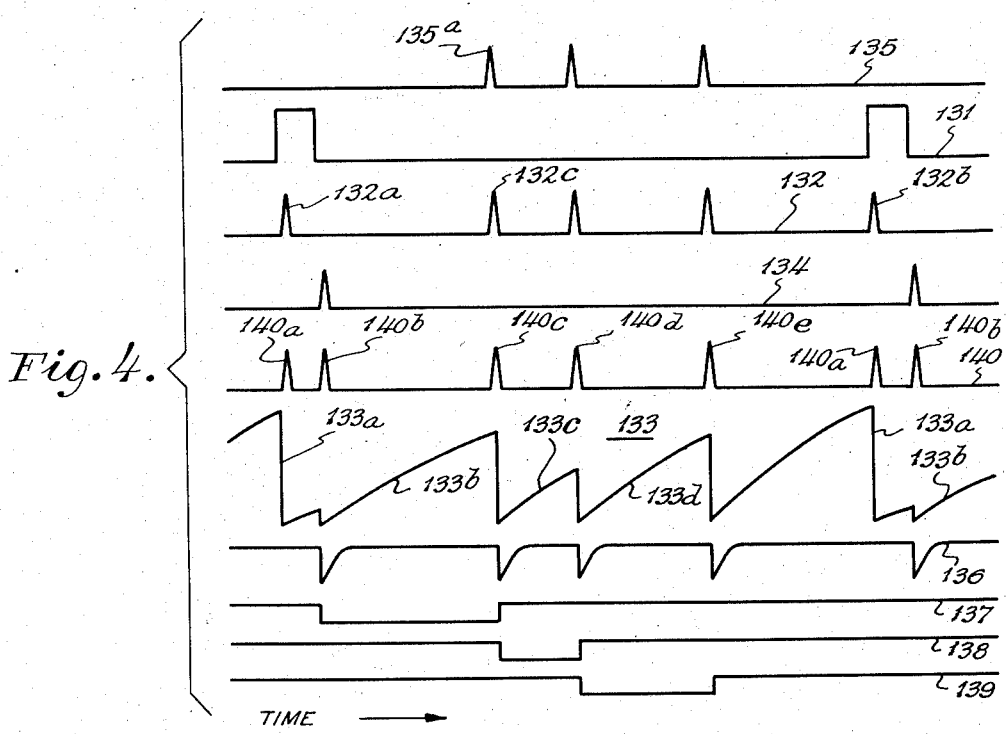
Fig. 4 shows graphically, to a common time base, the type of signals developed at various points in the coder of Fig. 3.

Referring particularly to Fig. 1, a radar transmitter-receiver system of the plan position indicator type is indicated at 21, the transmitter part being indicated as housed in the left-hand section of this unit 21 and the receiver part being housed in the right section. A highly directive antenna 23 which may employ a paraboloidal reflector 25 is supported on a rotatable column 27 which is hollow and is arranged for guiding radio frequency energy from the transmitter part of unit 21 to the antenna 23, and for guiding received energy from antenna 23 to the receiver part of unit 21.

The transmitter includes a pulse generator and a radio frequency carrier wave transmitter responsive thereto for generating very high intensity output pulses of extremely short duration, e. g. for producing pulses of several kilowatts peak power and of duration of the order of a microsecond, the pulse repetition rate being of the order of 1000 pulses per second, for example. The receiver may include a superheterodyne receiving circuit, and unit 21 may further include a transmitting-receiving radio-frequency switching means such as the well known T-R box.

A motor 29 is coupled to the antenna system 23 through a speed reduction gear train 31, for producing continuous rotation of the antenna at a rate which may be 6 revolutions per minute, for example. A selsyn transmitter 101 is coupled to the antenna system 23, as through a 1:1 ratio spur gear 33. This selsyn transmitter receives primary circuit energization from a source 35, such as a generator of 60 cycles per second sinusoidal voltage, and provides a plurality of output alternating voltages between different pairs of the plural conductors 37.

A radar presentation apparatus 39 is arranged to receive the input and output voltages of the selsyn transmitter 101 for azimuth sweep direction control of a cathode ray oscilloscope 41 therein, and to receive trigger pulses from the synchronizing oscillator of the transmitter section of unit 21, and to receive the video output of the receiver part of this unit, to produce a map of the locations of energy reflecting objects, the internal arrangements of unit 39 may take any of a variety of well known forms, an illustrative arrangement for this purpose being set out in Fig. 2, and being described subsequently in reference thereto.

A radio frequency transmitter 45 coupled through a radio frequency output conduit 47 to a directive antenna 49 is employed to provide efficient transmission of radio frequency energy to a receiver system including a further directive antenna 51, a radio frequency conduit 53, and a radio frequency receiver 55 tuned to the frequency of the transmitter 45.

The radio frequency output of transmitter 45 is modulated according to a composite wave (illustrated in Fig. 11) produced in the output circuit of the combining unit 57, which has one input circuit coupled to the video output terminals of the receiver part of unit 21 and another input circuit coupled to the trigger pulse terminals of the transmitter part of radar unit 21. Yet another input circuit of the combining unit 57 is supplied with recurrent series of output pulses from unit 59. This unit 59 is arranged to generate reference pulses and variably spaced signal-representing pulses and to control the time intervals thereamong according to simultaneous values of the several voltages in transmitter 101 taken at very short intervals throughout the period of the excitation wave from generator 35, e. g. at intervals of $\frac{1}{4800}$ second.

A separator unit 61 is arranged to receive the demodulated output receiver 55 and to provide separate output components in three different output circuits corresponding to the separate input components of the combining circuit 57. The reproduced video and trigger pulse output components provided through unit 61 are supplied to the video and range sweep synchronization terminals of a remote indicator 39' which may be a duplicate of unit 39 in the transmitter equipment. The output component of unit 61 corresponding to the pulse time modulated output component from unit 59 is supplied to the input circuit of a pulse time reconverter 63 arranged for reconstructing plural sinusoidal voltages corresponding exactly in relative strength and phase with the input voltages of unit 59. These output voltages may be employed for actuating a selsyn repeater 237 arranged to rotate a pointer at all times in synchronism with the azimuth direction of the antenna system 23.

As shown in Fig. 2, the indicator 39 (and similarly the indicator 39') may include a cathode ray oscilloscope 41 arranged for magnetic deflection of the cathode ray under the influence of a magnetic deflection yoke built into a cylindrical casing 65. The magnetic deflection coils in this casing 65 may be connected through slip rings 67 and cooperating brushes to the output circuit of a sawtooth current wave generator 69 arranged with a synchronization pulse input circuit for receiving the trigger pulses generated in the transmitter. A selsyn receiver or repeater unit 71 is arranged to rotate the magnetic deflection yoke in synchronism with the rotation of the antenna 23, so that the direction of radial deflection of the oscilloscope beam continuously changes in synchronism with the antenna rotation, and hence, the angular positions of signal images correspond to the azimuth angle directions in space of the energy reflecting objects.

The video signals from the radar receiver are supplied to video input terminals of unit 39, and thence through a coupling capacitor 73 to the control grid circuit of the cathode ray oscilloscope 41. Filament heating power for this oscilloscope is supplied by a low voltage alternating current or direct current output circuit of a suitable power supply 75, and the grid and anode and focussing electrode voltages for the tube 41 are supplied from voltage divider circuits across a very high voltage direct current supply circuit of the power supply 75. A potentiometer 79 is connected in the output circuit of power supply 75, and its movable tap 77 is adjusted to bias the control grid of the oscilloscope 41 approximately to beam cut-off bias voltage, so that contrasting brightly illuminated areas are produced upon the screen of tube 41 by the positive voltage excursions in the video signals supplied from the receiver part of unit 21.

Returning now to Fig. 1, it will be apparent that where indication only at a central station is desired to be produced according to radar scanners distributed at selected distant points, the oscilloscope unit 39 may be dispensed with in the radar pulse transmitting-receiving station, indicator 39, only being employed at the central station. Of course, even in such arrangements, an oscilloscope unit 39 may be provided at the stations and may be permitted to run continuously, or may be arranged to be switched on only when local test work is to be conducted; or provisions may be made for conveniently connecting a portable version of indicator 39 when necessary for special local tests or for servicing of the radar scanning station.

The details of the pulse time converter 59 are set forth in connection with Figs. 3 and 5 of the drawings and those of the sinusoidal wave reconstructing apparatus 63 are set forth in Figs. 6 and 9. These two units are also shown and separately claimed in my copending application Serial No. 710,781, filed November 19, 1946.

The details of the combining circuit apparatus 57 are shown in Fig. 10, and those of the separating circuit apparatus 61 are shown in Fig. 12, and these units per se are claimed in my copending application Serial No. 738,055, filed March 29, 1947, now Patent No. 2,570,249, issued October 9, 1951.

Referring to Fig. 3 there is shown a selsyn transformer 101 having a rotor winding 102 and three stator windings 103, 104 and 105. Rotor winding 102 is connected to a pair of terminals 106 which in turn may be connected to any suitable source of alternating current, not shown. Terminals 106 are also connected to the primary winding 107 of a transformer 108 having a secondary winding 109.

Stator windings 103, 104 and 105 are shown as being Y-connected, the open end of winding 103 being connected to terminal 110, that of winding 104 being connected to terminal 111, and the open end of winding 105 being grounded. Terminal 112 is connected to one side of secondary winding 109 of transformer 108, the other side of this winding being grounded.

Terminals 110, 111 and 112 are connected respectively to electronic switches 113, 114 and 115. Each of these switches has associated with it and is actuated by a gate, these gates being designated respectively 116, 117 and 118. The outputs from switches 113, 114 and 115 are connected together and to coincidence blocking oscillator 119.

A master blocking oscillator 120 is provided and one of its outputs is supplied to gate 116. Gate 116 is connected to gate 117, and gate 117 in turn is connected to gate 118.

One of the outputs of coincidence blocking oscillator 119 is supplied to off-trigger generator 121, the output of which in turn is supplied to each of gates 116, 117 and 118.

Another of the outputs of coincidence blocking oscillator 119 is supplied to data blocking oscillator 122, which is also supplied with an output of master blocking oscillator 120. Another output of master blocking oscillator 120 is supplied to reference blocking oscillator 123. The outputs of blocking oscillators 122 and 123 are furnished to and combined in a collector cathode follower unit 124, the single output of which is supplied through output cathode follower unit 125 to output terminal 126 and also to reset cathode follower unit 127. The output of the latter unit is supplied to sawtooth generator 128, the output of which is supplied to coincidence blocking oscillator 119. The output wave of generator 128 may be of any suitable form, as for example, a rising exponential function of time.

In operation, when an alternating voltage is applied to terminals 106 three alternating voltages are present at terminals 110, 111 and 112 with respect to ground, the amplitudes of these voltages depending upon the position of rotor winding 102 with respect to stator windings 103, 104 and 105. In accordance with the present invention, each of these three voltages is sampled many times per cycle and used to determine the displacement in time of a pulse which appears at output terminal 126.

Let it first be assumed that master blocking oscillator 120 is in operation at the desired repetition rate, as for example 1350 cycles per second. This oscillator is so constructed that there is a definite time interval between the leading and trailing edges of each output pulse, as for example 8 microseconds. The output wave is represented by curve 131 of Fig. 4.

The leading edge of each pulse from master blocking oscillator 120 actuates data blocking oscillator 122 to produce a pulse represented by pulses 132a and 132b of curve 132 in Fig. 4. Each of these pulses is supplied to collector cathode follower unit 124 and, after passing through output cathode follower unit 125, becomes the first pulse of a synchronizing doublet. In addition, each pulse from collector cathode follower unit 124 is supplied to reset cathode follower unit 127, which in turn serves to reset sawtooth generator 128, as indicated by portions 133a of curve 133 in Fig. 4.

The trailing edge of each pulse from master blocking oscillator 120 actuates reference blocking oscillator 123 to produce a corresponding pulse, shown in curve 134 of Fig. 4, which is supplied to collector cathode follower unit 124. After passing through output cathode follower unit 125, each of these pulses becomes the second pulse of a synchronizing doublet appearing at output terminal 126. The same pulse at the output of collector cathode follower unit 124 is also supplied to reset cathode follower unit 127, which again resets sawtooth generator 128, the latter unit thereafter presenting a rising sawtooth wave to coincide blocking oscillator 119, as indicated by portions 133b of curve 133.

The trailing edge of each pulse from master blocking oscillator 120 opens gate 116, which in turn renders switch 113 conductive. This permits the voltage between terminal 110 and ground to be supplied to coincidence blocking oscillator 119, in which it is combined with the output voltage of sawtooth generator 128. When the sum of these two voltages exceeds a predetermined value, coincidence blocking oscillator 119 is tripped to produce pulse 135a of curve 135. The output of coincidence blocking oscillator 119 actuates off-trigger generator 121, the output of which, indicated by curve 136, is supplied to gate 116 to cause this gate to close. This renders switch 113 non-conductive and the sampling of the voltage at terminal 110 is thus completed.

The action of coincidence blocking oscillator 119 which causes the closing of gate 116, in the manner just described, actuates data blocking oscillator 122, causing it to produce a pulse which is indicated by pulse 132c in curve 132. This pulse, after passing through collector cathode following unit 124 and output cathode follower unit 125, forms a first intelligence pulse at output terminal 126. The same output of collector cathode follower unit 124 also actuates reset cathode follower unit 127, which in turn resets sawtooth generator 128 as before, and a new sawtooth wave begins to rise at the input to coincidence blocking oscillator 119, as indicated by portion 133c of curve 133.

The closing of gate 116 causes gate 117 to open, rendering switch 114 conductive and thus permitting the voltage at terminal 111 to reach coincidence blocking oscillator 119. Once again, off-trigger generator 121 is actuated as soon as the sum of the voltage at terminal 111 and the output voltage of sawtooth generator 128 exceeds a given value, turning gate 117 off and rendering switch 114 non-conductive. The same cycle of events is now repeated by gate 118 and switch 115 for sampling the voltage appearing at terminal 112.

Upon the closing of gate 118, sawtooth generator 128 is reset as above described. Although the output of this generator rises, coincidence blocking oscillator 119 cannot fire because it is supplied with no signal voltage from any of switches 113, 114 and 115 until the next cycle begins. This is true because coincidence blocking oscillator 119 is so designed that the voltage from sawtooth generator 128 alone is never sufficient to cause it to fire.

The gating voltages developed respectively by gates 116, 117 and 118 are shown by curves 137, 138 and 139 of Fig. 4. The series of pulses appearing at output terminal 126 is represented by curve 140, and will be seen to comprise a synchronizing doublet consisting of pulses 140a and 140b followed by intelligence pulses 140c, 140d and 140e. The value of the voltage between terminal 110 and ground is represented by the spacing in time between the second pulse 140b of the synchronizing doublet and intelligence pulse 140c. The time interval between intelligence pulses 140c and 140d corresponds with the voltage between terminal 111 and ground. The voltage between terminal 112 and ground is represented by the elapsed time between intelligence pulses 140d and 140e.

Figure 5:
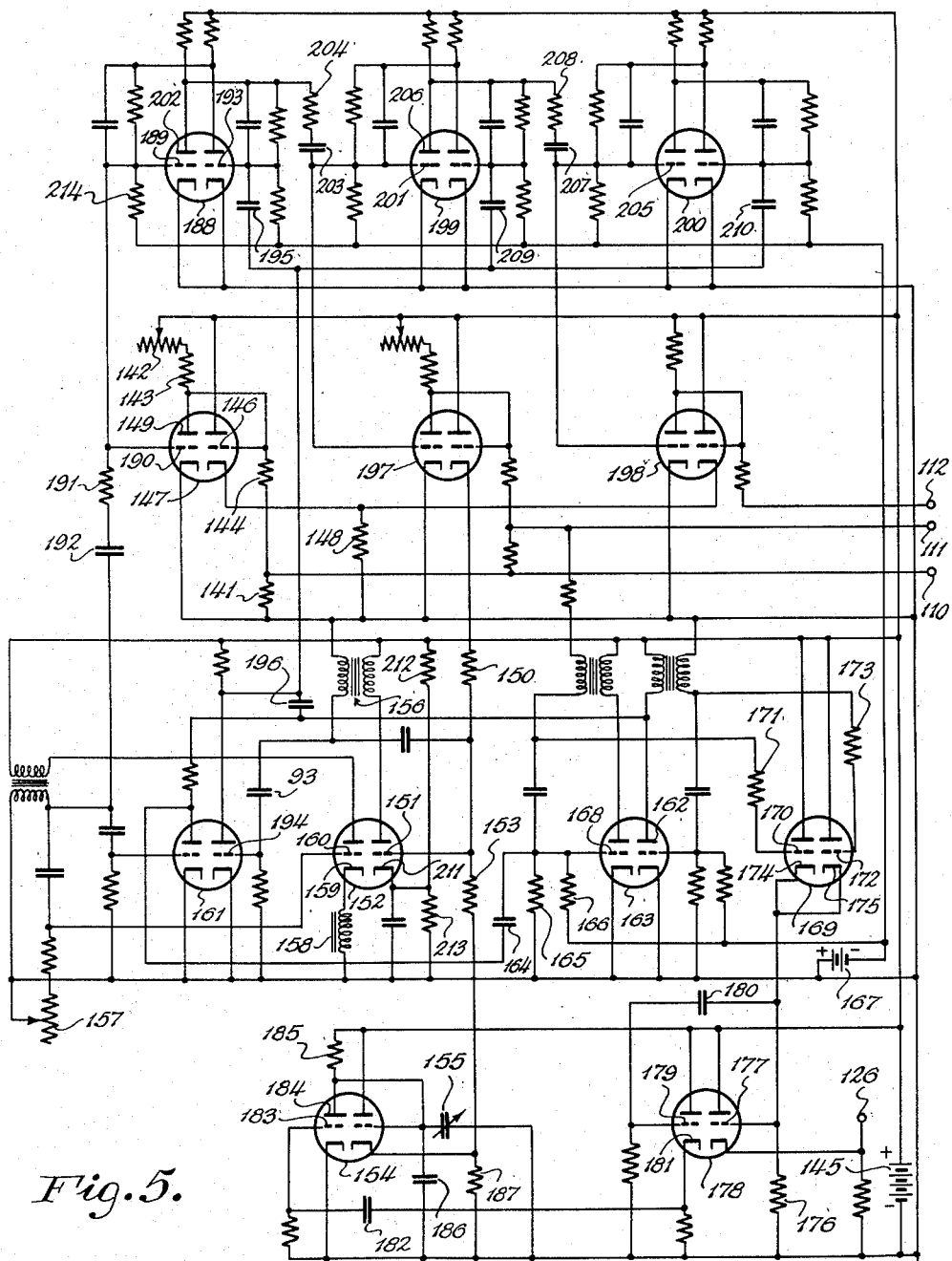
Fig. 5 is a schematic circuit diagram of the portion of the coder of Fig. 3 represented by blocks 13—25, 27 and 28.

Fig. 5 shows, in schematic form, the circuit details of the coder of Fig. 3. The voltage appearing between terminal 110 and ground is applied across a resistor 141, which constitutes a portion of a voltage divider also comprising a rheostat 142 and resistors 143 and 144 in series. The open terminal of rheostat 142 is connected to the positive terminal of potential source 145, the negative terminal of which is grounded, and the junction of resistors 143 and 144 is connected to control electrode 146 of the right-hand portion of vacuum tube 147, which is arranged as a cathode follower with a load resistor 148. The junction of resistors 143 and 144 is also connected to anode 149 of the left-hand portion of vacuum tube 147. The two portions of tube 147 serve as an electronic switch (represented by block 113 in Fig. 3). When this switch is "closed" or conducting, the voltage across load resistor 148 is substantially the same as that at control electrode 146, and hence is proportional to the voltage between terminal 110 and ground (plus a portion of the voltage of source 145).

The voltage across load resistor 148 is applied, by means of resistor 150, to control electrode 151 of the right-hand portion of vacuum tube 152, which functions as the coincidence blocking oscillator 119 of Fig. 3. Also applied to control electrode 151, through resistor 153, is the output voltage of sawtooth generator 128 of Fig. 3, comprising vacuum tube 154. The time constant of this generator is adjusted to a desired value, as for example 90 microseconds, by means of trimmer capacitor 155. Cathode 211 of vacuum tube 152 is connected to the junction of resistors 212 and 213 in series across potential source 145, so that it is maintained at a positive potential higher than either that developed across resistor 148 or the output potential of sawtooth generator 128. When both of the latter two potentials are present, however, control electrode 51 reaches such a potential relative to cathode 211 that coincidence blocking oscillator 119 trips or fires and produces a pulse at the secondary winding of output transformer 156. The manner in which the firing of coincidence blocking oscillator 119 acts upon switches 113, 114 and 115 (Fig. 3) will be explained later.

Master blocking oscillator 120 (Fig. 3) comprises the left-hand portion of vacuum tube 152, and is of the single-swing type. Its grid-circuit time constant is adjusted by means of rheostat 157 to obtain the desired repetition rate, as for example 1350 cycles per second. An inductance coil 158 is connected between cathode 159 and ground, its purpose being so to lengthen the positive half of the grid cycle that its leading edge may be used to place the first pulse (140a in Fig. 4) of the synchronizing doublet, and its trailing edge to place the second pulse 140b of the doublet (Fig. 4) a desired interval later, as for example 8 microseconds.

The voltage developed at control electrode 160 of master blocking oscillator 120 is amplified and inverted by the left-hand portion of vacuum tube 161, the output voltage of which is applied to anode 162 of the right-hand portion of vacuum tube 163, which functions as data blocking oscillator 122 (Fig. 3). This output voltage is also applied to a differentiating network comprising capacitor 164 and resistors 165 and 166. Resistors 165 and 166 are connected in series between ground and the negative terminal of potential source 167, the positive terminal of which is grounded. The junction of resistors 165 and 166, to which capacitor 164 connects, is also connected to control electrode 168 of the left-hand portion of vacuum tube 163 which functions as reference blocking oscillator 123 of Fig. 3. Since a blocking oscillator may be triggered by a positive pulse applied to its control electrode or with a negative pulse applied to its anode, it is apparent that data blocking oscillator 122 will fire at a time corresponding to the rise of the first half of the grid cycle of master blocking oscillator 120, and reference blocking oscillator 123 will fire with the fall of the same first half grid cycle.

Vacuum tube 169 functions as collector cathode follower 124 (Fig. 3). Control electrode 170 is connected, through resistor 171, to the grid circuit of reference blocking oscillator 123; and control electrode 172, through resistor 173, connects to the input circuit of data blocking oscillator 122. Since cathodes 174 and 175 are connected together and grounded through common load resistor 176, vacuum tube 169 functions to combine or add the pulses from both oscillators. When both oscillators are resting, cathodes 174 and 175 are at a small positive potential. The firing of either oscillator causes, first, an increase in its grid potential which appears at cathodes 174 and 175 as a positive voltage, and second, a decrease in its grid potential below cut-off of vacuum tube 169. Since the collector cathode follower cannot follow these negative excursions of the oscillator grid voltages, the output voltage developed across resistor 176 consists of a series of pulses of high positive value, the series being repeated at the repetition rate of master blocking oscillator 120. This output voltage is applied to control electrode 177 of the right-hand portion of vacuum tube 178, which functions as output cathode follower 125 having output terminal 126 (Fig. 3).

The left-hand portion of vacuum tube 178 serves as reset cathode follower 127 of Fig. 3. Its control electrode 179 is coupled to control electrode 177 of output cathode follower 125 by means of capacitor 180, so that positive pulses appearing at output terminal 126 are reproduced at cathode 181, which in turn is coupled by capacitor 182 to control electrode 183 of the left-hand portion of vacuum tube 154. This tube functions as sawtooth generator 128 (Fig. 3). Anode 184 is connected to the positive terminal of potential source 145 by means of resistor 185, and is by-passed to ground by capacitors 155 and 186 in parallel. Reset pulses applied through capacitor 182 drive control electrode 183 heavily positive, thereby throughly discharging capacitors 155 and 186 and momentarily reducing the potential of anode 184 to a value closely approaching zero. Thus the sawtooth generator is reset.

After resetting, control electrode 183 returns to a high negative value, beyond the cut-off value of the tube, and the potential of anode 184 rises exponentially and unimpeded towards the potential of source 145. This negative bias voltage is maintained by grid-circuit rectification which takes place during the resetting pulses. The right-hand portion of vacuum tube 154 serves as a cathode follower to reproduce, across its output resistor 187, the sawtooth voltage developed at anode 184.

Vacuum tube 188 functions as gate 110 (Fig. 3). This tube is connected in an Eccles-Jordan trigger circuit, so that current flows in only one portion of the tube at a time. A negative pulse applied to one control electrode causes the corresponding portion of the tube to become non-conductive and the other portion conductive, and vice versa. Control electrode 189 of the left-hand portion of vacuum tube 188 is directly connected to control electrode 190 of the left-hand portion of switching vacuum tube 147, and the common connection is coupled by means of resistor 191 and capacitor 192 to the input circuit of the left-hand portion of vacuum tube 152, which functions as master blocking oscillator 120 (Fig. 3). When a negative voltage pulse is applied through capacitor 192, control electrodes 189 and 190 become negative with respect to ground, so that the left-hand portion of vacuum tube 147 is cut off. This permits the right-hand portion of vacuum tube 147, which functions as a cathode follower, to conduct, so that the "switch" is effectively closed or conductive. When a negative voltage pulse is applied to control electrode 193 of the right-hand portion of vacuum tube 188, in a manner to be described subsequently, control electrode 189 rises to a small positive voltage relative to ground, causing control electrode 190 to go positive and the left-hand portion of vacuum tube 147 to become conductive, so that the "switch" is effectively open or non-conductive.

The right-hand portion of vacuum tube 161 functions as the off-trigger generator 121 of Fig. 3. Its control electrode 194 is coupled by means of capacitor 93 to the input circuit of coincidence blocking oscillator 119, so that a positive pulse is applied to electrode 194 when the oscillator fires at the end of a sampling process. The right-hand portion of vacuum tube 161 inverts and amplifies this pulse, the resultant negative pulse being supplied to control electrode 193 of vacuum tube 188 by means of capacitor 195, and to anode 162 of vacuum tube 163 through capacitor 196.

All the apparatus directly associated with the channel supplied by terminal 110 has now been discussed. Vacuum tubes 197 and 198 serve as switches 114, 115 of Fig. 3, in a manner similar to that described in connection with vacuum tube 147, the right-hand portions of these three tubes having common cathode resistor 148. Likewise, vacuum tubes 199 and 200, functioning as gates 117 and 118 (Fig. 3) are analogous, with respect to terminals 111 and 112, to vacuum tube 188, serving as gate 116, relative to terminal 110.

To secure a sequential operation of the three gates, control electrode 201 of vacuum tube 199 is coupled to anode 202 of vacuum tube 88 by means of capacitor 203 and resistor 204, and control electrode 205 of vacuum tube 200 is coupled to anode 206 of vacuum tube 199 through capacitor 207 and resistor 208. Thus, when a negative voltage pulse is applied to control electrode 193 through capacitor 195, gate 116 is turned off and anode 202 of vacuum tube 188 falls in potential. This produces a negative pulse on control electrode 201, turning gate 117 on after a delay of a few microseconds due to resistor 204. When gate 117 in turn is turned off by a negative pulse through capacitor 209, the fall in potential at anode 206 turns on gate 118 after a small delay interval due to resistor 208. When gate 118 is turned off by a negative pulse through capacitor 210, all the gates remain off.

A complete sequence of the coding operation will now be described, reference being made to Figs. 3, 4 and 5 of the drawings. The cycle starts when the leading edge of the output pulse (curve 131) of master blocking oscillator 120 triggers data blocking oscillator 122, forming first pulse 140a of the synchronizing doublet. Data blocking oscillator 122 resets sawtooth generator 128 by means of collector cathode follower 124 and reset cathode follower 127 (portion 133a of curve 133).

After a predetermined interval, as for example 8 microseconds, the trailing edge of the output pulse (curve 131) of master blocking oscillator 120 triggers reference blocking oscillator 123 forming second pulse 140b of the synchronizing doublet. The output of master blocking oscillator 120 is differentiated by elements 191, 192 and 214, and applied to control electrode 189 of gate 116. This in turn opens gate 116 (curve 137) and renders switch 113 conductive so that the voltage at input terminal 110 is sampled. In the meantime, the output voltage (curve 133) of sawtooth generator 128 has risen slightly. Reference blocking oscillator 123 resets sawtooth generator 128 to zero again by means of collector cathode follower 124 and reset cathode follower 127.

The output voltage of sawtooth generator 128 again rises (portion 133b of curve 133) until the total voltage between control electrode 151 of vacuum tube 152, comprising coincidence blocking oscillator 119, and ground reaches a predetermined value, as for example 143 volts. The time interval required to reach this value depends upon the instantaneous voltage being sampled at terminal 110, and may for example vary from 20 to 142 microseconds. Coincidence blocking oscillator 119 fires, producing an off-trigger voltage pulse (curve 136) through off-trigger generator 121, and intelligence pulse 140c by means of data blocking oscillator 122, collector cathode follower 124, and output cathode follower 125. Thus intelligence pulse 140c follows second synchronizing pulse 140b by a time interval whose duration is a function of the instantaneous voltage at terminal 110. Gate 116 (curve 137) is turned off by the off-trigger voltage (curve 136), thereby rendering switch 113 non-conductive and bringing to an end the sampling of the voltage at terminal 110. Very shortly after gate 116 is turned off, gate 117 (curve 138) is turned on, thus rendering switch 114 conductive and permitting the sampling of the voltage at terminal 111 to begin. Sawtooth generator 128 is reset to zero by data blocking oscillator 122 through collector cathode follower 124 and reset cathode follower 127.

Once again, the output voltage of sawtooth generator 128 rises (portion 133c of curve 133) until the total voltage at control electrode 151 reaches the above-mentioned predetermined value. The time interval required to reach this value is dependent upon the instantaneous voltage being sampled at terminal 111, and may for example vary from 20 to 142 microseconds. Coincidence blocking oscillator 119 fires, producing an off-trigger voltage pulse (curve 136) through off-trigger generator 121, and intelligence pulse 140d by means of data blocking oscillator 122, collector cathode follower 124, and output cathode follower 125. Intelligence pulses 140c and 140d are thus separated by a time interval whose duration is a function of the instantaneous voltage at terminal 111. Gate 117 (curve 136) is turned off by the off-trigger voltage (curve 136), so that switch 114 is rendered non-conductive and the sampling of the voltage at terminal 111 ended. Almost immediately after gate 117 is turned off, gate 118 (curve 139) is turned on, so that switch 115 becomes conductive and the sampling of the voltage at terminal 112 is permitted to begin. Sawtooth generator 128 is reset to zero by data blocking oscillator 122 through collector cathode follower 124 and reset cathode follower 127.

Once again, the output voltage of sawtooth generator 128 rises (portion 133d of curve 133) until the total voltage at control electrode 151 reaches the above-mentioned predetermined value. The time interval required to reach this value is dependent upon the instantaneous voltage being sampled at terminal 112, and may for example vary from 11 to 203 microseconds. (The range here given by way of example is different from that given above in connection with the sampling of the voltages at terminals 110 and 111 since, in the arrangement shown in Fig. 3, the peak value of the reference voltage developed across winding 109 of transformer 108 may exceed the peak value of the voltages applied respectively to terminals 110 and 111.) Coincidence blocking oscillator 119 fires, producing an off-trigger voltage pulse (curve 136) through off-trigger generator 121, and intelligence pulse 140e, by means of data blocking oscillator 122, collector cathode follower 124 and output cathode follower 125. Thus intelligence pulse 140e follows intelligence pulse 140d by a time interval whose duration is a function of the instantaneous voltage at terminal 112.

Gate 118 (curve 138) is turned off by the off-trigger voltage (curve 136), so that switch 115 is rendered non-conductive and the sampling of the voltage at terminal 112 ended. The output voltage of sawtooth generator 128 continues to rise and would reach a high value, as for example 250 volts, after a long interval of time. However, since no switch is conductive at this time, this voltage is insufficient to cause the coincidence blocking oscillator to fire. After gate 118 is turned off and switch 115 thus rendered non-conductive, all the gates remain turned off and all the switches remain non-conductive until the next sampling cycle is started. It is important to note that, following a circuit disturbance, as for example a momentary interruption of power, only one sampling cycle is required to restore an improper gate or switch condition to normal.

Figure 6:
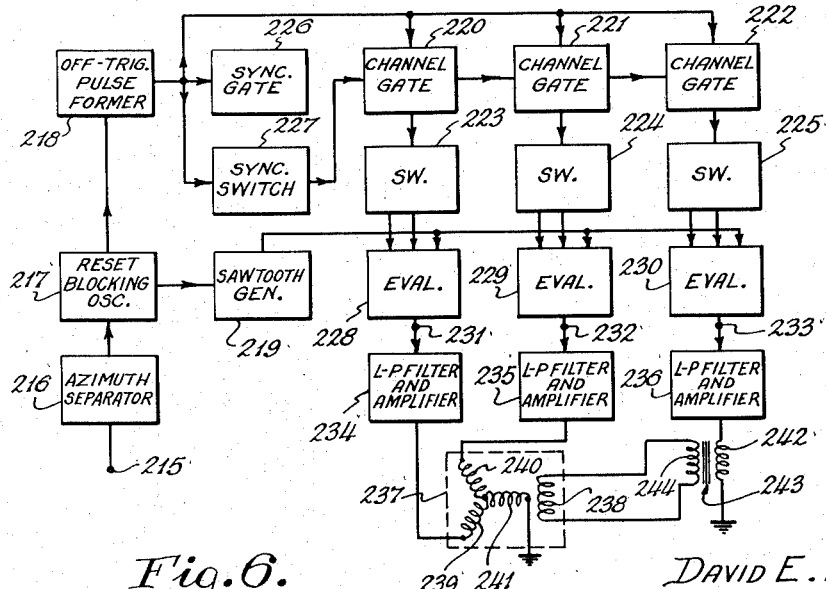
Fig. 6 represents, partly in block form, a decoder and associated apparatus for use at the receiving end of a teledata system according to the present invention.

Fig. 6 is a block diagram of the decoder and associated apparatus. Input signals, from the coder of Figs. 3 and 5, are applied to input terminal 215 and pass through azimuth separator unit 216. The output of this unit comprises a series of pulses such as shown by curve 350 of Fig. 7. These pulses are supplied to reset blocking oscillator 217, which in turn actuates off-trigger pulse former 218 and furnishes positive trigger voltages to sawtooth generator 219.

Off-trigger pulse former 218 provides negative trigger voltages (curve 351, Fig. 7), which are supplied to gates 220, 221 and 222 having associated with them switches 223, 224 and 225, respectively. (The latter six units are similar respectively to units 116, 117, 118, 113, 114 and 115 of the coder of Fig. 3.) The output of unit 218 is also supplied to synchronizing gate 226 and to synchronizing switch 227.

Figure 7:
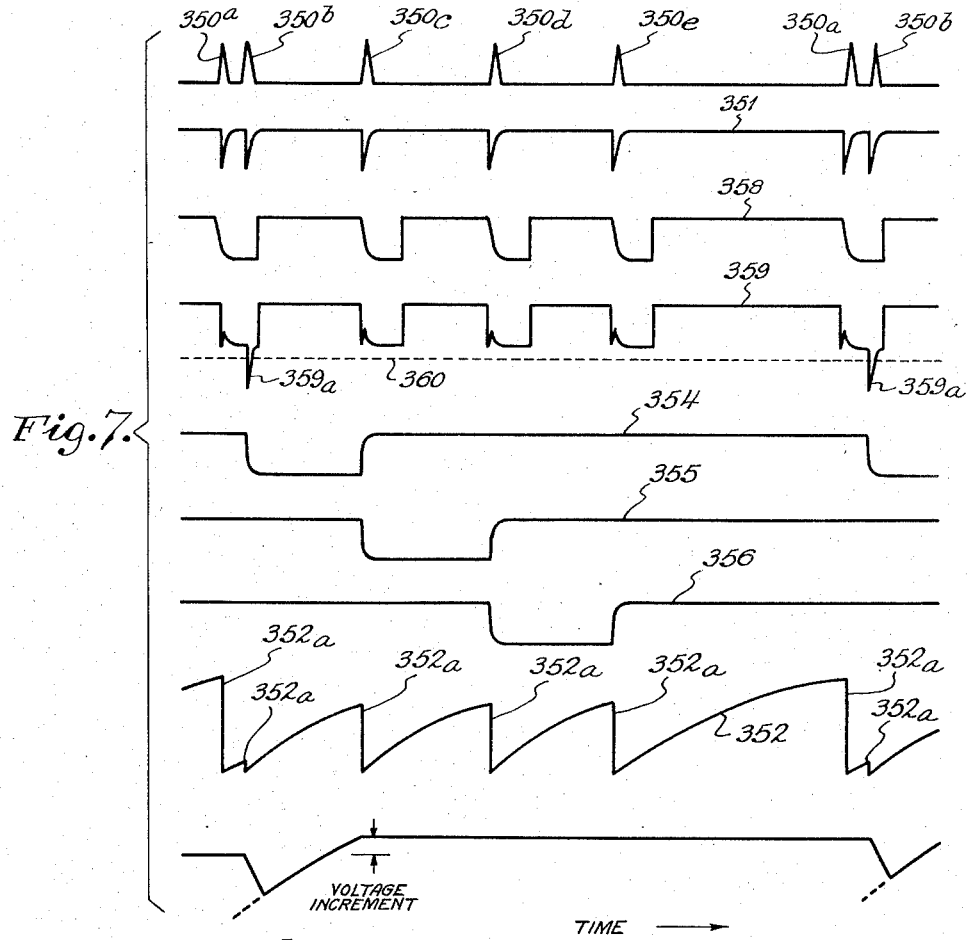
Figs. 7 and 8 show graphically the type of signals developed at various points in the decoder of Fig. 6.

Sawtooth generator 219 has an output waveform (curve 352, Fig. 7) which is substantially the same function of time as is that of sawtooth generator 128 (Fig. 3) of the coder. This output is supplied to evaluators 228, 229 and 230, which are respectively under the control of switches 223, 224 and 225. The evaluator outputs are connected to terminals 231, 232 and 233, respectively, which in turn supply low-pass filter and amplifier units 234, 235 and 236. The bottom graph in Fig. 7 represents the output of evaluator 228 of Fig. 6 by way of example.

A receiving selsyn transformer 237 is provided, having a rotor winding 238 and three stator windings 239, 240 and 241. The stator windings are shown as being Y-connected, the open end of winding 239 being connected to the output of unit 234, that of winding 240 to the output of unit 235, and the open end of winding 241 being grounded. The output of unit 236 is connected to one side of primary winding 242 of a transformer 243, the other side being grounded. Secondary winding 244 of transformer 243 is connected to rotor winding 238.

In operation, synchronizing gate 226 and synchronizing switch 227 are actuated by the first two pulses (350a and 350b in Fig. 7) of each sampling cycle comprising the synchronizing doublet, and prepare for operation gates 220, 221 and 222 by closing any one of these gates which happens to be open. Each synchronizing pulse also resets sawtooth generator 219, which has a decay time less than the time interval between the synchronizing pulses, as shown by portions 352a of curve 352 in Fig. 7. Succeeding intelligence pulses (350c, 350d and 350e of Fig. 7) reset sawtooth generator 219, in each instance after its output voltage has built up to a value dependent upon the time interval which has elapsed since the preceding pulse occurred.

Gate 220 is opened by the second synchronizing pulse (350b in Fig. 7) and remains open until the first intelligence pulse (350c in Fig. 7) fires reset blocking oscillator 217, causing off-trigger pulse former 218 to produce a negative pulse which closes gate 220. When gate 220 closes, gate 221 is caused to open. It remains open until closed by the occurrence of the second intelligence pulse (350d in Fig. 7). This closes gate 221 and opens gate 222. The latter gate is closed by the third intelligence pulse (350e in Fig. 7), and all the gates now are closed and remain closed until gate 220 is again opened by the synchronizing doublet of the next sampling cycle. The operation of these gates is shown graphically by curves 354, 355 and 356, respectively, of Fig. 7.

Figure 8:
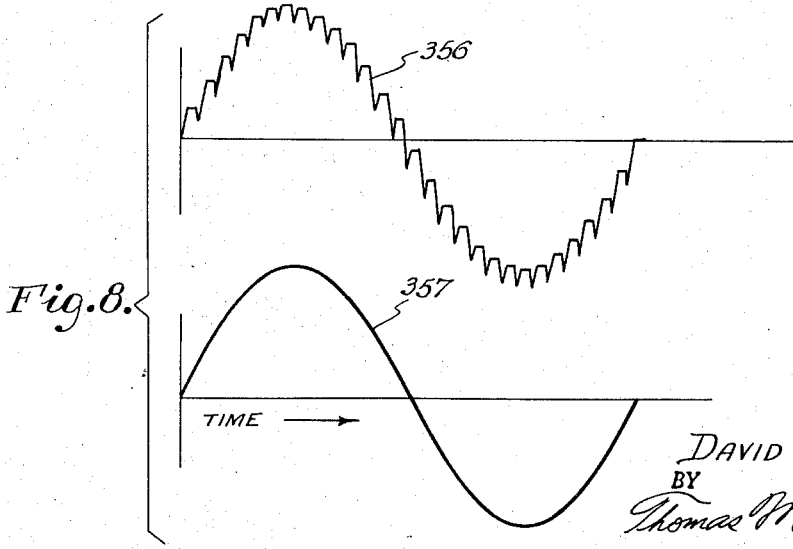

When any of gates 220, 221 and 222 is open, as described above, the corresponding one of switches 223, 224 and 225 is rendered conductive. This in turn causes the corresponding one of evaluators 228, 229 and 230 to be connected to the output of sawtooth generator 219. Let it be assumed, for example, that gate 220 has just been opened by synchronizing pulse 350b. Switch 223 is thus conductive and causes the output voltage of sawtooth generator 219 to be applied to evaluator 228. This voltage rises until intelligence pulse 350c occurs and resets sawtooth generator 219, and thus the voltage reaches a value which is a function of the time-spacing between pulses 350b and 350c. As these events are repeated for a plurality of sampling cycles, the output voltage of evaluator 228, appearing at terminal 231, consists of successive peaks of the interrupted sawtooth voltage (curve 356, Fig. 8) and contains, as a fundamental component obtained by filtering, a duplicate (curve 357, Fig. 8) of the voltage applied to terminal 110, in Fig. 3.

Since the voltages developed at terminals 232 and 233 are likewise duplicates, after filtering, of the voltages applied respectively to terminals 111 and 112 in Fig. 3, it will be readily apparent that the rotor of receiving selsyn transformer 237 will reproduce the rotational displacements of the rotor of transmitting selsyn transformer 101 in Fig. 3. It will be equally obvious that the system of the present invention is not limited to the transmitting and reproduction of three selsyn voltages, in the manner here shown and described by way of example, but may be employed with fully equivalent results to transmit a plurality of voltages, regardless of their source, and reproduce them at the receiving end with proper relative instantaneous values.

Reference is now made to Fig. 9, which shows, in schematic form, the circuit details of the decoder of Fig. 6. Input terminal 215 is connected to the control electrodes 245 of a vacuum tube 246, which functions as azimuth separator 216 of Fig. 4. Tube 246 is so biased as to respond only to positive excursions applied to control electrode 245, such signals rendering the tube conductive. Negative potentials applied to control electrode 245 have no appreciable effect on the operation of tube 246. Thus, since the desired input signals comprise positive pulses (curve 350, Fig. 7), they are effectively separated from any negative voltages which may also be present at terminal 215.

The left-hand portion of vacuum tube 247 functions as reset blocking oscillator 217 of Fig. 6. Anode 248 of vacuum tube 246 is connected to anode 249 of vacuum tube 247. On each signal pulse, tube 246 draws heavy anode current and thus causes the oscillator to fire. The constants of the oscillator are so chosen that its oscillations will decay to zero in a time interval less than that between successive pulses, so it fires on every pulse. Positive pulses are developed across grid winding 150 of coupling transformer 251 when the oscillator fires, and are supplied through lead 252 to reset the sawtooth generator 219 (Fig. 6), as described below.

The right-hand portion of vacuum tube 247 serves as off-trigger pulse former 218 of Fig. 6. Control electrodes 253 and 254 are connected together, so that large negative pulses are developed at anode 255 of tube 247 when the oscillator including the left-hand portion of this tube fires. These pulses, shown by curve 251 in Fig. 7, are supplied by means of lead 256 to gates 225, 221 and 222, synchronizing gate 126, and synchronizing switch 227 (Fig. 6).

Sawtooth generator 219 (Fig. 6) comprises the left-hand portion of vacuum tube 257, the control electrode 258 of which is supplied with positive pulses from reset blocking oscillator 217. By means of variable capacitor 259, the time constant of sawtooth generator 219 may be adjusted to correspond with that of sawtooth generator 128 of the coder (Fig. 3), so that an accurate reproduction of the transmitted signal voltages will be obtained. Each time sawtooth generator 219 is reset by a positive pulse from reset blocking oscillator 217, its control electrode 258 is heavily biased by grid-circuit conduction. The right-hand portion of vacuum tube 257 functions as a cathode follower which is driven by sawtooth generator 219 without placing an appreciable load thereon. The sawtooth output voltage developed across cathode resistor 260 is supplied, by means of lead 261, to evaluators 228, 229 and 230 (Fig. 6). This voltage is shown by curve 352 of Fig. 7.

Vacuum tube 262 functions as gate 220 (Fig. 6). This tube is connected as an Eccles-Jordan trigger circuit, so that current flows in only one portion of the tube at a time. A negative pulse applied to one control electrode causes the corresponding portion of the tube to become non-conductive and the other portion conductive, and vice versa. Control electrode 263 of the left-hand portion of vacuum tube 262 is directly connected to control electrode 264 of the left-hand portion of switching vacuum tube 265 and the common connection in turn is connected to electrodes 266 and 267 of the right-hand portion of vacuum tube 268, which functions as synchronizing switch 227 (Fig. 6) in a manner to be described later. When a negative voltage pulse is applied by virtue of the last-mentioned connection, control electrodes 263 and 264 become negative with respect to ground, so that the normally conducting left-hand portion of vacuum tube 265 is cut off and the potential of its anode 269 rises to the instantaneous value of the sawtooth voltage developed across resistor 260 as previously explained. When the left-hand portion of vacuum tube 265 is conducting, lead 261 carrying the sawtooth voltage is effectively grounded through resistor 270.

Anode 269 of vacuum tube 265 is directly connected to control electrode 271 of the left-hand portion of vacuum tube 272, which functions as evaluator 228 (Fig. 6). When this portion of this tube is conductive, holding capacitor 273 (connected to its cathode 276) is charged substantially to the potential of source 274, to the positive terminal of which anode 275 of vacuum tube 272 is connected. Cathode 276 is also connected to control electrode 277 of the right-hand portion of vacuum tube 272, which functions as a cathode follower. Control electrode 278 of the right-hand portion of gating vacuum tube 262, which is coupled to off-trigger pulse lead 256 by means of capacitor 289, is also connected to control electrode 279 of the right-hand portion of switching vacuum tube 265. Anode 280 of this tube portion is connected by means of resistor 281 to control electrode 277 of vacuum tube 272. When the right-hand portion of switching vacuum tube 265 is rendered conductive by the action of gating tube 262, therefore, holding capacitor 273 is discharged through resistor 281. The resultant output voltage, as developed across resistor 282, appears at output terminal 231. How the value of this voltage is determined will now be explained.

Let it be assumed that holding capacitor 273 has been charged through the left-hand portion of vacuum tube 272, as described above. When a negative pulse renders the left-hand portion of switching vacuum tube 265 non-conductive, its right-hand portion becomes conductive. At this instant, the sawtooth generator output voltage, developed across resistor 260, begins to rise. While the magnitude of this voltage is less than the voltage drop across holding capacitor 273 due to its charge, capacitor 273 discharges through resistor 281. When the sawtooth voltage reaches a value which exceeds that across the capacitor, however, the flow of current through the capacitor reverses and the capacitor is charged, so that the voltage across it rises with the sawtooth voltage.

The voltage across holding capacitor 273 is reproduced across resistor 282, due to the action of the right-hand portion of vacuum tube 272 as a cathode follower, and hence appears at output terminal 231. Thus the output voltage comprises a series of step voltages (curve 356, Fig. 8) the value of each of which depends upon the extent to which the sawtooth generator voltage is permitted to rise before it is reset by the next signal pulse. An envelope of these individual step voltages (curve 357, Fig. 8), therefore, corresponds closely with the original input voltage applied to terminal 110 of the coder (Fig. 3).

All the apparatus directly associated with the channel which supplies output terminal 231 has now been discussed. Gating vacuum tube 283, switching vacuum tube 284 and evaluator vacuum tube 285, all associated with output terminals 232, are respectively analogous to vacuum tubes 262, 265 and 272, already described in connection with the channel of output terminal 231, and serve respectively as gate 221, switch 224 and evaluator 229 of Fig. 6. Likewise, vacuum tubes 286, 287 and 288 respectively perform gating, switching and evaluating functions in the channel which supplies output terminal 233, and hence correspond respectively to gate 222, switch 225 and evaluator 230 of Fig. 6.

To secure a sequential operation of the three channels, control electrode 290 of vacuum tube 283 is coupled to anode 291 of vacuum tube 262 by means of capacitor 292 and resistor 293, and control electrode 294 of vacuum tube 286 is coupled to anode 295 of vacuum tube 283 through capacitor 296 and resistor 297. Thus, when a negative voltage pulse is applied to control electrode 278 through capacitor 289, gate 220 is turned off and anode 291 of vacuum tube 262 falls in potential. This produces a negative pulse on control electrode 290, turning gate 221 on after a delay of a few microseconds due to resistor 293. When gate 221 in turn is turned off by a negative pulse through capacitor 298, the fall in potential at anode 295 turns on gate 222 after a small delay intreval due to resistor 297. When gate 222 is turned off by a negative pulse through capacitor 299, all the gates remain off.

The two portions of vacuum tube 300, which comprises synchronizing gate 226 (Fig. 6), are connected as a one-shot multivibrator. The right-hand portion is normally conducting. This is the steady-state condition. If a negative pulse is applied to control electrode 301 from off-trigger pulse lead 256 through capacitor 302, conduction is transferred to the left-hand portion and the synchronizing gate may be said to be turned on. The latter portion continues to conduct for an interval dependent upon the values of resistance and capacitance selected, and then conduction is transferred back to the right-hand portion until another negative pulse is applied to control electrode 301. By so selecting the circuit constants that the interval during which the left-hand portion of vacuum tube 300 is conductive exceeds the time interval between the signal pulses comprising the synchronizing doublet (pulses 350a and 350b of Fig. 7), synchronizing gate 226 will be turned on by pulses 350a, 350c, 350d, and 250e, but not by pulse 350b. This is illustrated by curve 358 of Fig. 5.

The left-hand portion of vacuum tube 268, which serves as synchronizing switch 227 (Fig. 6), functions as a cathode follower. Its control electrode 303 is connected to the junction of resistors 304 and 305 which are connected in series between anode 306 of the left-hand portion of vacuum tube 300 and the negative terminal of potential source 307, the positive terminal of which is grounded. Thus, when the left-hand portion of vacuum tube 300 is conducting, control electrode 303 becomes substantially negative relative to ground and cathodes 308 and 309, which are connected together, remain approximately at ground potential. Since control electrode 263 of vacuum tube 262, to which electrodes 266 and 267 of vacuum tube 268 are both directly connected, is normally substantially at ground potential, the diode comprised of the right-hand portion of vacuum tube 268 does not conduct and no negative pulse is developed and used to open gate 220 (Fig. 6). This is the situation after the occurrence of the first synchronizing pulse (350a in Fig. 7), but before the occurence of the second synchronizing pulse (350b in Fig. 7).

Cathodes 308 and 309 of vacuum tube 268 are coupled to off-trigger pulse lead 256 by means of capacitor 310. The negative voltage pulse due to the second synchronizing pulse (350b in Fig. 7), therefore, is applied to cathodes 308 and 309, causing the right-hand portion of vacuum tube 268 to become conductive. Gate 220 (Fig. 6) is thereby turned on, and electrodes 266 and 267 of the right-hand portion of vacuum tube 268 then become substantially negative relative to ground.

After the occurrence of the second synchronizing pulse (350b in Fig. 7) but before the first intelligence pulse (350c in Fig. 7) occurs, synchronizing gate 226 (Fig. 6) returns to its steady-state condition. This causes control electrode 303 of vacuum tube 268, and hence cathodes 308 and 309, to assume a positive potential with respect to ground. Electrodes 266 and 267, comprising the anode of the diode portion of vacuum tube 268, are substantially negative relative to ground. Synchronizing switch 227 (Fig. 6) is therefore so biased that the negative pulse due to the first intelligence pulse (350c in Fig. 7), which is applied through capacitor 310, is insufficient to render the diode conductive, and is thus without effect. The above-described operation of the synchronizing switch is illustrated by curve 359 (Fig. 7), the portions 359a comprising the trigger pulses for gate 220 (Fig. 6), and broken line 360 representing the diode clipping potential.

The situation is similar just before the occurrence of the remaining intelligence pulses (350d and 350e in Fig. 7), so that these pulses are likewise without effect. Thus it will be apparent that gate 220 can be opened, and the resultant sequence of operations initiated, only by the occurrence of a pair of pulses having a predetermined maximum time-spacing. The sequence cannot be started by a single signal pulse, nor by a pair of pulses having a time-spacing greater than the predetermined value.

Referring to Fig. 10, there is shown a video amplifier comprising a first vacuum tube 401, the control electrode 402 of which is coupled by means of a capacitor 403 to the movable arm or slider 404 of a potentiometer 405 which in turn is connected between video signal input terminals 406 and 407. A resistor 408 is connected between control electrode 402 and ground. Cathode 409 of vacuum tube 401 is grounded through resistor 410. Screen-grid 411 is connected to a source of suitable positive potential diagrammatically illustrated at 412, and suppressor-grid 413 is grounded.

The anode 414 of vacuum tube 401 is connected through a resistor 415 and an inductor 416 to a source of suitable positive potential indicated at 417. Anode 414 is also coupled, by means of capacitor 418, to the control electrode 419 of second vacuum tube 420. A resistor 421 is connected between control electrode 19 and ground.

Cathode 422 of vacuum tube 420 is grounded through a resistor 423 shunted by a capacitor 424. The screen-grid 425 of vacuum tube 420 is connected to positive source 412, and the suppressor-grid 426 is grounded.

The anode 427 of vacuum tube 420 is connected through a resistor 428 and an inductor 429 to positive potential source 417. Anode 427 is also coupled, by a capacitor 430, to the control electrode 431 of a vacuum tube 432. Control electrode 431 is connected through resistor 433 to the junction of series-connected resistors 434 and 435, which are connected as a voltage divider between potential source 417 and ground.

The cathode 436 of vacuum tube 432 is connected to ground through a potentiometer 437, the movable arm 438 of which is connected to an output terminal 439, the other output terminal 440 being grounded. The screen-grid 441 and the anode 442 of vacuum tube 432 are both connected to potential source 417. The suppressor-grid 443 of vacuum tube 432 is grounded.

Vacuum tube 444 has its cathode 445 connected to cathode 436 of vacuum tube 432. The control electrode 446 of vacuum tube 444 is connected to the movable arm 447 of a potentiometer 448, which in turn is connected in series with a resistor 449 between source 417 and ground. A capacitor 450 is connected between control electrode 446 and ground. The screen-grid 451 of vacuum tube 444 is connected to source 417, as is anode 452. The suppressor-grid 453 of vacuum tube 444 is grounded.

For the purpose of introducing trigger signals, a pair of terminals 454 and 455 are provided, the latter terminal being grounded. Terminal 454 is coupled by a capacitor 456 to the control electrode 457 of the left-hand portion of vacuum tube 458. A resistor 459 is connected between control electrode 457 and ground. The cathode 460 is grounded. The anode 461 is connected through a resistor 462 to source 417, and is coupled by a capacitor 463 to the cathode 464 of the right-hand portion of vacuum tube 458. Cathode 464 is connected to ground by a resistor 465. The control electrode 466 and the anode 467 of the right-hand portion of vacuum tube 458 are connected together and to cathode 409 of vacuum tube 401.

A pair of terminals 468 and 469 are provided for the purpose of introducing the azimuth signal input, terminal 469 being grounded. Terminal 468 is coupled by a capacitor 470 to the control electrode 471 of a vacuum tube 472, control electrode 471 being connected by a resistor 473 to a source of suitable negative potential indicated at 474. The cathode 475 is grounded, as is the suppressor-grid 476. The screen-grid 477 is connected to source 417. The anode 478 is connected through a resistor 479 to anode 427 of vacuum tube 420.

In operation, the positive video signals which are applied to input terminals 406 and 407 are amplified by vacuum tubes 401 and 420, the extent of this amplification being controllable by the setting of the potentiometer 405. Inductors 416 and 429 in the anode circuits respectively of vacuum tubes 401 and 420 serve as peaking choke coils.

The positive trigger signals are applied to terminals 454 and 455 and are shaped by vacuum tube 458. The positive trigger signal voltages charge capacitor 456, and this charge leaks off exponentially through resistor 459. Thus a trigger pulse having a steep leading edge and a sloped trailing edge is developed across resistor 462 and applied to diode cathode 464 by means of capacitor 463. If desired, capacitor 463 may be made adjustable and used as a trigger signal gain control. The output of the trigger shaping circuit, which may for example comprise pulses having an amplitude of 40 volts, is mixed additively with the radar video signals in view of the connection from the diode anode (electrodes 466 and 467) to cathode 409 of vacuum tube 401. The right-hand portion of vacuum tube 458 serves as a diode rectifier to prevent any negative radar video signals, which may be developed across resistor 410, from feeding back through the trigger shaping circuit.

The azimuth signal input is applied to terminals 468 and 469, and may comprise 150-volt positive pulses. Vacuum tube 472 is normally biased far below cut-off, since its control electrode 471 is connected to negative potential source 474 having for example, a potential of 105 volts. When the positive azimuth pulses are applied through capacitor 470 to control electrode 471, however, vacuum tube 472 becomes conductive and a large current flows through resistors 428 and 479 in its anode circuit. Since resistor 428 is common to the anode circuits of vacuum tubes 472 and 420, this large current flow through vacuum tube 472 causes anode 427 of vacuum tube 420 to change its potential with respect to ground in a negative direction. Its potential may, for example, become less positive by approximately 100 volts during each azimuth signal pulse.

The composite signal wave at the output of the video amplifier comprising vacuum tubes 401 and 420 is fed, by means of capacitor 430, to vacuum tube 432, which is arranged to operate as a cathode follower. Cathode 436 of this vacuum tube is normally positive with respect to ground, as for example by 25 volts. Since the azimuth pulses always cause at least 60-volt negative excursions of anode 427, even when the radar trigger and azimuth pulses are coincident, the azimuth pulses will drive control electrode 431 sufficiently negative with respect to cathode 436 to cut off vacuum tube 432. In this manner, the azimuth pulses take precedence over the video or trigger signals.

The output of cathode follower vacuum tube 432 is developed across potentiometer 437, and a desired portion of it is chosen by the setting of movable arm 438 and appears between output terminals 439 and 440.

Vacuum tube 444 serves as a clipper, and has its control electrode 446 maintained at a desired positive potential relative to ground depending upon the setting of sliding arm 447 of potentiometer 448. By suitably adjusting this positive potential, the extent of the negative excursions of cathode 445 due to the azimuth pulses may be limited to a desired value. Thus potentiometer 448 serves as an azimuth gain control.

The composite output wave developed between terminals 439 and 440 (Figs. 1 and 10) is illustrated in Fig. 11. It includes high-intensity negative pulses corresponding to the pulses of wave 351 of Fig. 7, these pulses conveying a version of the output of the pulse time converter 59 of Figs. 1, 3 and 5. The output wave of Fig. 11 also includes very high intensity positive pulses 482, 482', 482" corresponding to the trigger pulses from the transmitter of radar unit 21 (Fig. 1), these pulses being in exact synchronism with the radar pulse transmissions.

The composite wave of Fig. 11 yet further includes a video signal component of maximum intensity limited to the value represented by line 480, and appreciably lower than the intensities of the trigger pulses. This video component represents the intensity variations which must be effected in the cathode ray beam in the indicator as it is swept radially outward from the center to the rim of the oscilloscope in each interval between successive trigger pulses.

The composite wave shown in Fig. 11 represents an oscillogram of more than two transmitted radar pulse cycles extent, illustrating the significance of the frequency relations among units 21 and 59 of Fig. 1, as well as the general principles of operation of unit 57. The intervals between successive ones of trigger pulses or range sweep synchronization pulses 482, 482' and 482" may be of the order of 1/1000 second, the corresponding radar pulse frequency being 1000 pulses per second. This frequency allows unambiguous indications of object distances up to approximately 90 miles.

The period P of the pairs 600, 600', 600" of reference pulses extending in the negative direction (i. e., below dotted line 601) in Fig. 11 is of the same order of magnitude as that of the period P of the radar trigger pulses, but is unequal thereto. Whereas 1000 trigger pulses may occur per second, the number of pairs per second of the reference pulses 600, 600', 600" . . . , from unit 59 must be different from the trigger pulse frequency and free from any simple harmonic relation therewith. For example, a frequency of 1350 reference pulse pairs per second may be provided by unit 59, so that the period P is 1/1350 second.

Fig. 11 illustrates the variation of the inter-pulse spacings of the negative pulses representing the input voltage and the two output voltages of the selsyn transmitter 101. Spacing $c$ represents an instantaneous value of the selsyn transmitter input voltage, and spacings $a$ and $b$ represent corresponding instantaneous values of the first and second output voltage waves, respectively, from selsyn unit 101. It is apparent that in the successive instantaneous measurements of the voltage values at 1/1350 second intervals, the successive ones of intervals $a$, $a'$, $a''$ are increasing, those of $b$, $b'$, $b''$ are decreasing, and those of $c$, $c'$, $c''$ are increasing. Assuming a selsyn transmitter primary supply frequency of 60 cycles per second, 22½ sets of these measures are taken in each cycle with a frequency of unit 59 of 1350 cycles or pulse series per second.

A study of the video signal pattern reveals three prominent peaks or "pips" in the interval between trigger pulse 482 and the next trigger pulse 482'. The first of these, designated 605, is at a position of approximately 150 microseconds delay, corresponding to a distance of an energy reflecting object of approximately 13½ miles. The next of these peaks, 607, is at a time-position of 420 microseconds delay after pulse 482, and hence represents an object at approximately 38 miles distance. The third, designated 609, is at a position of approximately 720 microseconds delay, indicating presence of an energy reflecting object at a distance of approximately 65 miles.

Pip 605 is limited in intensity to the maximum video output intensity represented by line 480, through the limiting action in the radar receiver. This pip is relatively broad, and may represent the energy reflected from the near side of a large hill or a very extensive object such as a very large building, for example, the transmission paths to different parts thereof being of various lengths within an appreciable range of distances.

Since the speed of rotation of antenna 23 is quite low, e. g. of the order of 6 R. P. M. (36° per second), and since the pulse repetition rate is of the order of 1000 pulses per second, the pulse repetition rate expressed in terms of the speed of revolution of the antenna 23 may be said to be the quotient of 1000 and 36, or approximately 28 pulses per degree revolution of the antenna. Conversely, the antenna progresses .036° per radar pulse. Now, since the angular breadth of the directive pattern produced by the antenna 23 normally is of the order of 1° to 2°, it will be apparent that an energy reflecting object in a given direction will be impinged upon by a series of many successive radar pulses, and will produce a corresponding series of many reflected and received radar signals all delayed after the corresponding transmitted pulses by a time delay corresponding to the distance of the object.

This is illustrated in Fig. 11, wherein the three distinct energy reflecting objects represented by pulses 605, 607 and 609 are similarly represented by reflected pulses correspondingly displaced after the next transmitted pulse 482', these pulses being designated 605', 607' and 609' respectively. Near the extreme right-hand end of the view of Fig. 11, a still further pulse 605'' received via reflection from the nearest of these three energy reflecting objects is apparent.

The importance of making unit 59 (Fig. 1) to operate at a different pulse series repetition rate from the pulse repetition rate of the radar transmitter now becomes apparent from an inspection of Fig. 11. In this illustration, one of the negative pulses 611 is noted to have interfered with pulse 605' from the nearby object, splitting the broad positive pulse which normally should appear into two narrow pulses spaced by a very narrow time interval. A narrower pulse, such as pulse 609', upon coincidence with one of the negative pulses, would be entirely obliterated by the preferential response to the azimuth signalling pulses in combined unit 57. If this condition were repeated in several successive intervals between radar pulses, certain target indications would be lost, and thus, the radar picture would be seriously altered, rendering it unreliable.

However, with the appreciable difference maintained between the radar pulse repetition rate and the repetition rate of the pulses produced by unit 59, the occasions of interference of the negative pulses with the positive pulses are made both infrequent and random. Considering the 25 to 50 successive pulses of radar energy which will impinge upon a given reflecting object of finite area, in view of the beam width, antenna rotation speed, and pulse repetition rate as discussed above, by far the greater number of reflected pulses detected in the receiver part of the radar unit 21 will be represented by intact video pulse wave portions in the composite wave produced at the output circuit of unit 59.

As an illustration of this, note that pulse 605 and pulse 605'', pulses immediately preceding and immediately succeeding the partially destroyed pulse 605', are intact, and are well removed from the respective nearest negative pulses. This would be true of still further pulses of energy reflected from this nearby reflecting object, and in the corresponding radial sweeps of the remote P. P. I. indicator 39' (Fig. 1), by far the greater part of these sweeps, at the successive angles around the face of the indicator tube 41 of the order of .06°, within an angular sector of the order of 1° breadth, accurately represent the video signals just as reproduced at the receiver output terminals of unit 21.

Thus, in view of the deliberate asynchronism of the radar pulses and the azimuth pulse series, the radar picture produced on remote indicator 39' exactly duplicates that produced on unit 39 located at the radio station, and there is no effect whatever discernible on the face of indicator 39' of the occasional interferences such as that illustrated at 611, 605' in Fig. 11.

Referring now to Fig. 12, which is a schematic circuit diagram of the signal-separating arrangements of the present invention, there is shown a video amplifier 500 having input terminals 501 and 502, the latter terminal being grounded. The ungrounded output terminal of video amplifier 500 is coupled by means of a capacitor 503 to the control electrode 504 of a vacuum tube 505. Control electrode 504 is connected by means of a resistor 506 to a source of negative potential 507 having, for example, a potential of three volts.

The cathode 508 of vacuum tube 505 is connected through a resistor 509 to a video output terminal 510. The other video output terminal 511 is grounded. A resistor 512 is connected between terminals 510 and 511.

The screen-grid 513 of vacuum tube 505 is connected to positive potential source 417. The suppressor-grid 514 is connected to cathode 508. The anode 515 is connected through a resistor 516 to positive potential source 417, and is coupled by means of capacitor 517 to the control electrode 518 of a vacuum tube 519. The resistor 520 is connected between control electrode 518 and ground.

The cathode 521 of vacuum tube 519 is grounded. The screen-grid 522 is connected to the junction of resistors 523 and 524 connected in series between positive potential source 417 and ground, and this electrode is by-passed to ground by a capacitor 525. The suppressor-grid 526 is grounded. The anode 527 is connected to an azimuth signal output terminal 528, the other azimuth signal output terminal 529 being grounded. The anode 527 is connected to an azimuth signal output terminal 528, the other azimuth signal output terminal 529 being grounded.

Cathode 509 of vacuum tube 505 is coupled by a capacitor 530 to the control electrode 531 of a vacuum tube 532. Resistors 533 and 534 are connected in series between control electrode 531 and negative potential source 474.

The cathode 535 of vacuum tube 532 is grounded, as is the suppressor-grid 536. The screen-grid 537 is connected to positive potential source 417. The anode 538 is connected to source 417 through a resistor 539, and is coupled by a capacitor 540 to the control electrode 541 of a vacuum tube 542. A resistor 543 is connected between control electrode 541 and ground. The cathode 544 is grounded, as is the suppressor-grid 545. Screen-grid 546 is connected by a resistor 547 to the junction of a resistor 548 and a capacitor 549 connected in series between potential source 417 and ground. The anode 550 is connected through an inductor 551 and a resistor 552 to the junction of resistors 547 and 548.

Anode 550 is coupled by a capacitor 553 to the control electrode 554 of the left-hand portion of a vacuum tube 555, a resistor 556 is being connected between this control electrode and ground. The anode 557 is connected to positive potential source 417.

The cathode 558 of the left-hand portion of vacuum tube 55 is connected to ground through a resistor 559 and is coupled by a capacitor 560 to the control electrode 561 of a thyratron 562. Control electrode 561 is connected by a resistor 563 to the movable arm of a potentiometer 564, which in turn is connected in series with a resistor 565 between ground and negative potential source 474. The cathode 566 of thyratron 562 is connected to ground through a resistor 567, and is directly connected to a trigger signal output terminal 568, the other trigger signal output terminal 569 being grounded. The anode 570 of thyratron 562 is connected through a resistor 571 to positive potential source 417. A series network comprising a resistor 572 and a capacitor 573 is connected between anode 570 and ground.

Cathode 558 of the left-hand portion of vacuum tube 555 is also coupled by a capacitor 574 to the control electrode 575 of the right-hand portion of vacuum tube 555. Control electrode 575 is connected to the junction of resistors 576 and 577 which are in turn connected in series between ground and negative potential source 474. The cathode 596 is grounded.

The anode 578 of the right-hand portion of vacuum tube 555 is connected through a resistor 579 to positive potential source 417, and is coupled by a capacitor 580 to the control electrode 581 of the left-hand portion of a vacuum tube 582. A resistor 583 is connected between control electrode 581 and ground. The cathode 584 is grounded. The anode 585 is connected through a resistor 586 to positive potential source 417, and is also connected by a resistor 587 shunted by a capacitor 588 to the control electrode 589 of the right-hand portion of vacuum tube 582.

Control electrode 589 is connected by a resistor 590 to negative potential source 474. The cathode 591 is grounded. The anode 592 is connected to the junction of resistor 579 and capacitor 580. This junction is also connected by a resistor 593 to the junction of resistors 533 and 534, the latter junction being by-passed to ground by a capacitor 594. A voltmeter 595 may be connected between ground and the junction of resistors 533 and 534, as shown.

In operation, the input signal which is applied to terminals 501 and 502 comprises a composite wave having the general characteristics shown in Fig. 11. Since video amplifier 500 is assumed to have an even number of stages, a similar composite wave is applied to control electrode 504 of vacuum tube 505. This vacuum tube operates as a cathode follower, and its control electrode 504 has applied to it a suitable negative bias potential, as for example three volts. This bias serves to limit the azimuth pulses to a desired value, as for example 11 volts. The video signal output appears across resistor 512 in the cathode circuit of vacuum tube 505 and may be utilized at terminals 510 and 511.

Resistor 516 in the anode circuit of vacuum tube 505 has no appreciable effect upon the operation of this tube as a cathode follower since, the tube being a pentode, its anode current is determined largely by the potential applied to sceeen-grid 513. The negative azimuth pulses from video amplifier 500, however, cause the anode current of vacuum tube 505 to be cut off, thus producing positive excursions of anode 515 which may, for example have a magnitude of approximately 20 volts. These positive anode excursions are applied to control electrode 518 of vacuum tube 519, which is so biased as to respond only to positive excursions. Such signals render the tube conductive, causing the azimuth pulse output to be developed between terminals 528 and 529.

The output of vacuum tube 505, as developed across its cathode resistors 509 and 512, is applied to control electrode 531 of vacuum tube 532, which functions as a trigger signal separator. Control electrode 531 is normally biased to a substantial negative value, as for example approximately 40 volts. This bias is sufficient to cut off the tube for peak values of the radar video signal. The azimuth signal pulses are of negative polarity and hence have no effect upon vacuum tube 532. The trigger signal pulses are positive and have approximately double the amplitude of the peak radar video signals. Thus each trigger pulse overcomes the normal negative bias on control electrode 531 and renders vacuum tube 532 conductive for the brief duration of each pulse.

The resultant negative anode swings are amplified by vacuum tube 542, which operates with zero bias on its control electrode 541. The purpose of series screen resistor 547 is to reduce the anode current of this vacuum tube to a reasonable value. Each negative trigger pulse from vacuum tube 532 causes the anode current of vacuum tube 542 to be cut off. Inductor 551 in the anode circuit of this tube sharpens the resultant positive trigger pulses developed at anode 550. These pulses, which may for example have an amplitude of between 50 and 60 volts, are applied to control electrode 554 of the left-hand portion of vacuum tube 555, this tube portion functioning as a cathode follower and serving to provide an impedance step-down.

The positive trigger pulses developed across resistor 559 are applied to control electrode 561 of thyratron 562. This electrode is negatively biased by an amount depending upon the setting of potentiometer 564, so that the trigger pulses must exceed this bias potential in order to fire thyratron 562. Thus potentiometer 564 serves as a trigger sensitivity control. Resistor 572 limits the current flow through thyratron 562. The trigger pulses developed across resistor 567 may be utilized at trigger output terminals 568 and 569. These pulses for example may have a duration of 1 microsecond at 70 volts and one ampere.

For the purpose of maintaining the positive trigger pulses applied to control electrode 561 of thyratron 562 at a substantially constant level, a feedback loop is provided. The positive pulses developed across cathode resistor 559 associated with vacuum tube 555 are applied by means of capacitor 574 to control electrode 575 of the right-hand portion of vacuum tube 555. This electrode is normally held at a substantially negative potential, as for example approximately 66 volts, by the voltage divider comprising resistors 576 and 577. The right-hand portion of vacuum tube 555 conducts on each positive trigger pulse which exceeds this bias potential, and the resultant negative voltage swings of anode 578 are employed to trigger a "one-shot" multivibrator comprising vacuum tube 582. The left-hand portion of this vacuum tube is normally conducting so that its anode 585 has approximately the same potential as its control electrode 581. The right-hand portion of vacuum tube 582 is normally non-conducting.

When negative trigger pulses are received from vacuum tube 555, control electrode 581 is rendered increasingly negative so that the left-hand portion of vacuum tube 582 is cut off. The resultant positive swings of anode 585 are fed through resistor 587 shunted by capacitor 588 to control electrode 589 of the right-hand portion of vacuum tube 582, thereby rendering this electrode less negative and causing the right-hand portion of the tube to become conductive. Anode 592 thereupon becomes decreasingly positive, and this negative voltage swing is applied through an integrating network comprising resistors 593 and 534 and capacitor 594 to control electrode 531 of vacuum tube 532. Capacitor 594 is normally charged so that its ungrounded terminal is substantially negative with respect to ground, as for example by 40 volts. The negative voltage swings of anode 592 increase the negative voltage on capacitor 594 and thus increase the negative bias which is applied to control electrode 531 of vacuum tube 532.

Capacitor 594 is charged negatively at a slow exponential rate. This gradually increases the negative bias voltage on control electrode 531 of vacuum tube 532 until the pulse amplitude developed across cathode resistor 559 associated with vacuum tube 555 is reduced to a desired value, as for example to less than 50 to 60 volts. When this condition is reached, the multivibrator comprising vacuum tube 582 rests until it is triggeered by another pulse from anode 578 of vacuum tube 555. The charge and discharge of capacitor 594 occurs at a rate faster than the amplitude variation of the radar trigger pulses, but less rapidly than the pulse repetition rate. In this manner, the average pulse amplitude delivered at output terminals 568 and 569 remains essentially constant for a wide range of amplitudes for the input pulses applied by capacitor 530 to vacuum tube 532. The small departure from the average in the amplitude of individual pulses applied to control electrode 561 of thyratron 562, due to hunting action of the feedback circuit, is well within the firing range of the tube and hence introduces no difficulty.

As pointed out above, the negative charge on capacitor 594 increases as a function of the amplitude of the trigger signal pulses applied by capacitor 530 to control electrode 531 of vacuum tube 532. Although these input pulses are of extremely short duration, it is evident that the voltage across capacitor 594, as indicated by example by voltmeter 595, is closely proportion to the amplitude of the input pulses.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A remote radar indicating arrangement comprising: a radar object distance and direction determining system including a recurrent pulse transmitter, a receiver and a directive scanning antenna; a radio data transmitting system coupled to said radar system for transmitting data therefrom to a remote radar picture presentation point, said radio data transmitting system comprising means for producing a radio frequency carrier and modulating it with a composite waveform of pulses of one polarity, pulses of the opposite polarity, and low-intensity video voltage variations; the pulses of said one polarity in said composite waveform being synchronous with the radar pulse transmissions for range sweep synchronization the pulses of the opposite polarity including phase reference pulses produced at a regular repetition rate appreciably higher than the maximum cyclical scanning speed of said antenna, and also including variable phase pulses delayed with respect to said phase reference pulses according to the instantaneous positions of said scanning antenna, and the low-intensity video voltage variations being the output voltage variations produced by said radar receiver; and a radio data receiving system at said remote presentation point, said receiving system comprising means for receiving the modulated carrier and detecting said composite waveform and separating it into three components according to polarity and intensity, and a cathode ray radar presentation oscilloscope for receiving signals through said receiving system and presenting the remote radar picture, said cathode ray oscilloscope including a range sweep circuit timed in synchronism with the pulses of said one polarity and thus in synchronism with the radar pulses, and also including means for varying the cathode ray beam according to said video voltage variations, and hence according to the output of said radar receiver, said cathode ray oscilloscope further including means responsive to the detected modulation component corresponding to said pulses of opposite polarity for changing the locus of the oscilloscope range sweep in accordance therewith.

2. A remote radar indicating system as defined in claim 1, wherein said means for producing a carrier and modulating it with a composite wave form of pulses of one polarity, pulses of the opposite polarity, and low intensity video voltage variations, comprises means for phase modulating the pulses of said opposite polarity according to the angular direction of aiming of said directive scanning antenna, and means for combining the phase modulated pulses of said opposite polarity with the radar range sweep synchronization pulses and video signal variations.

3. A remote radar indicating system comprising a radar object distance and direction determining system including a pulse transmitter and receiver and a directive scanning antenna, a radio data transmitting system coupled to said radar system for transmitting data therefrom to a remote radar picture presentation point, a radio data receiving system at said remote presentation point and a cathode ray radar presentation oscilloscope for receiving signals through said receiving system and presenting the remote radar picture; said radio data transmitting system comprising means including an azimuth data pulse coder responsive to angular movement of said directive antenna for providing recurrent reference pulses asynchronous with the recurrence frequency of the transmitted radar pulses and providing additional pulses spaced therefrom by delay intervals corresponding to angular position of the antenna, and means receiving the pulses produced by said last-named means and also receiving radar synchronization pulses and receiver output voltage variations from said radar system and transmitting a carrier wave modulated according to a composite pattern including all of said voltages; and said radio data receiving system comprising a radio receiver responsive to the carrier energy received over the transmission path from said transmitting system and providing amplified and detected output representing said composite modulation wave, means responsive to said receiver for separating said amplified and detected wave into three component parts, one being the recovered video wave for intensity modulation of said cathode ray oscilloscope and another being the synchronization pulses for controlling the sweep timing of said oscilloscope, and the remaining output component being the coded pulses representing angular position of the radar antenna, and decoder means responsive to said coded angular data pulses for supplying angular sweep control voltage to said radar presentation oscilloscope.

4. A remote radar indicating system comprising: a radar object distance and direction determining system including a pulse transmitter and receiver and a directive scanning antenna; said radar system including means for producing trigger pulses for controlling the transmission of pulses by said transmitter; coder means coupled to said antenna and responsive to angular movement thereof for providing recurrent reference pulses at a frequency unequal to the recurrence frequency of said radar trigger pulses and additional pulses of successive delay intervals corresponding to angular position of the antenna; means for receiving said reference pulses and said additional pulses from said coder means and also receiving trigger pulses from said radar transmitter and video output from said receiver and communicating to a remote point a composite wave embodying these components separably characterized therein; a radar data presentation oscilloscope at the remote point; means at said remote point and including three output circuits for separating said composite wave into the three components in said three output circuits, one of the output circuits providing a version of the video output of the radar receiver and being coupled to the intensity control of said oscilloscope, another of the output circuits providing a version of the radar transmitter trigger pulses and being coupled to the range sweep circuit of said radar presentation oscilloscope, and the remaining output circuit providing a version of said coder output reference pulses and additional pulses; and decoder means having an input circuit coupled to said remaining output circuit of said separating means and having an output circuit coupled to said radar data presentation oscilloscope for sweeping the data presentation beam thereof according to the angular progress of said directive scanning antenna.

5. A remote radar indicating system as defined in claim 4, wherein said means coupled to said antenna for providing recurrent reference pulses and additional pulses comprises a telemetric transmitter coupled to the antenna for receiving a sinusoidal input voltage and providing a plurality of sinusoidal output voltages, and means providing at least three additional pulses in each interval between reference pulses, the additional pulses being timed at intervals according to instantaneous values of respective ones of said sinusoidal voltages.

6. A remote radar indicating arrangement, comprising; a radar object distance and direction determining system including a pulse transmitter, a receiver and a directive scanning antenna; a radio data transmitting system coupled to said radar system for transmitting data therefrom to a distant point, said radio data transmitting system comprising means for producing a radio frequency carrier, means for pulse modulating said carrier in one sense synchronously with radar pulse transmissions, means for modulating said carrier in said first sense but to a lesser degree according to variations of output voltage of said radar receiver, and means for modulating said carrier in a sense different from said first sense according to variation of the angular direction of aiming of said directive scanning antenna; a presentation oscilloscope for operation at said remote point; and a radio data receiving system for operation at said remote point, said receiving system comprising means for detecting said carrier to recover the modulations thereof, means for selecting the demodulation components due to modulation in said first sense and producing range sweeps in said oscilloscope timed according to modulation excursions in said first sense exceeding a predetermined extent and varying intensity of the oscilloscope beam according to the variations of intensity less than said predetermined extent, and means for selecting the demodulation component due to modulation in said second sense and sweeping said oscilloscope beam in a direction non-parallel with the direction of said range sweeping according to this demodulation component.

References Cited in the file of this patent

UNITED STATES PATENTS

| | | |
|---|---|---|
| 2,293,899 | Hanson | Aug. 25, 1942 |
| 2,412,669 | Bedford | Dec. 17, 1946 |
| 2,412,670 | Epstein | Dec. 17, 1946 |
| 2,502,317 | Ewing | Mar. 28, 1950 |
| 2,519,935 | Smith et al. | Aug. 22, 1950 |
| 2,552,172 | Hawes | May 8, 1951 |
| 2,643,333 | Jacobsen | June 23, 1953 |

FOREIGN PATENTS

| | | |
|---|---|---|
| 604,273 | Great Britain | July 1, 1948 |